US010371954B2

(12) United States Patent
Perez Calero et al.

(10) Patent No.: US 10,371,954 B2
(45) Date of Patent: Aug. 6, 2019

(54) OPTOELECTRONIC MODULES INCLUDING HYBRID ARRANGEMENTS OF BEAM SHAPING ELEMENTS, AND IMAGING DEVICES INCORPORATING THE SAME

(71) Applicant: ams Sensors Singapore Pte. Ltd., Singapore (SG)

(72) Inventors: Daniel Perez Calero, Zurich (CH); Kai Engelhardt, Buckenhof (DE); Hartmut Rudmann, Jona (CH); Tobias Senn, Zurich (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 191 days.

(21) Appl. No.: 15/318,025

(22) PCT Filed: Jun. 4, 2015

(86) PCT No.: PCT/SG2015/050141

§ 371 (c)(1),
(2) Date: Dec. 12, 2016

(87) PCT Pub. No.: WO2015/191001

PCT Pub. Date: Dec. 17, 2015

(65) Prior Publication Data

US 2017/0108699 A1 Apr. 20, 2017

Related U.S. Application Data

(60) Provisional application No. 62/010,080, filed on Jun. 10, 2014.

(51) Int. Cl.
*G02B 9/00* (2006.01)
*G02B 9/08* (2006.01)
(Continued)

(52) U.S. Cl.
CPC .......... *G02B 27/0961* (2013.01); *G02B 1/10* (2013.01); *G02B 3/0056* (2013.01);
(Continued)

(58) Field of Classification Search
CPC ...................... G02B 13/0045; G02B 13/0015; G02B 13/18; G02B 7/021; G02B 13/004; G02B 9/60; H01L 2924/0002; H01L 2924/00
(Continued)

(56) References Cited

U.S. PATENT DOCUMENTS 6,649,807 B2 11/2003 Yoshikawa et al.
6,731,431 B2 5/2004 Sekine
(Continued)

FOREIGN PATENT DOCUMENTS

JP 2007-163656 6/2007
WO 2013/026175 2/2013

OTHER PUBLICATIONS

International Search Report issued by ISA/AU dated Sep. 30, 2015 for PCT/SG2015/050141.

*Primary Examiner* — William R Alexander
*Assistant Examiner* — Tamara Y. Washington
(74) *Attorney, Agent, or Firm* — Fish & Richardson P.C.

(57) ABSTRACT

The present disclosure describes optoelectronic modules (e.g., hybrid lens array packages) that have multiple optical channels, each of which includes at least one beam shaping element (e.g., a lens) that is part of a laterally contiguous array. Each optical channel is associated with a respective light sensitive region of an image sensor. Some or all of the channels also can include at least one beam shaping element (e.g., a lens) that is not part of a laterally contiguous array. In some cases, the arrays can include alignment features to facilitate alignment of the arrays with one another.

16 Claims, 20 Drawing Sheets

(51) Int. Cl.
*G02B 1/10* (2015.01)
*G02B 3/00* (2006.01)
*G02B 27/09* (2006.01)
*G02B 27/12* (2006.01)
*H04N 5/225* (2006.01)

(52) U.S. Cl.
CPC ......... *G02B 3/0075* (2013.01); *G02B 27/123* (2013.01); *H04N 5/2253* (2013.01)

(58) Field of Classification Search
USPC ..... 359/819, 728, 738, 619, 355; 348/218.1; 257/79, 432
See application file for complete search history.

(56) References Cited

U.S. PATENT DOCUMENTS 7,088,530 B1 8/2006 Recco et al.
7,187,501 B2 3/2007 Wakisaka
7,773,875 B2 8/2010 Jung et al.
7,944,633 B2 5/2011 Shyu et al.
8,526,129 B2 9/2013 Hirata et al.
2009/0052044 A1 2/2009 Nagata
2010/0283062 A1* 11/2010 Hsieh ................. H01L 21/6835 257/79
2010/0284089 A1 11/2010 Shyu et al.
2011/0063723 A1 3/2011 Shyu et al.
2011/0279913 A1 11/2011 Watanabe
2012/0014001 A1 1/2012 Kurihara
2013/0176625 A1 7/2013 Chen
2013/0265459 A1* 10/2013 Duparre ............. H04N 5/23238 348/218.1
2013/0342924 A1 12/2013 Matsuno et al.
2016/0133762 A1* 5/2016 Blasco Claret ... H01L 27/14625 257/432
2016/0349414 A1 12/2016 Rudmann et al.

* cited by examiner

SECTION A-A

OPTOELECTRONIC MODULES INCLUDING HYBRID ARRANGEMENTS OF BEAM SHAPING ELEMENTS, AND IMAGING DEVICES INCORPORATING THE SAME

FIELD OF THE DISCLOSURE

This disclosure relates to optoelectronic modules including hybrid arrangements of beam shaping elements, and imaging devices incorporating the same.

BACKGROUND

Optical imaging devices, such as multi-channel or array cameras, sometimes employ lenses stacked along the device's optical axis in order to achieve desired performance. Various problems with the lenses, however, can adversely impact the performance in such imaging applications. For example, some lens arrangements result in poor or sub-par alignment or may have relatively large manufacturing tolerances. Some manufacturing techniques may produce significant dimensional variations in the lenses. Further, in many consumer electronics and other applications, space is at premium. Thus, it often is desirable to reduce the overall footprint of the lens array package.

OVERVIEW

The present disclosure describes optoelectronic modules (e.g., hybrid lens array packages) that have multiple optical channels, some or all of which include at least one beam shaping element (e.g., a lens) that is part of a laterally contiguous array. Each optical channel is associated with a respective light sensitive region of an image sensor. Some or all of the channels also can include at least one beam shaping element (e.g., a lens) that is not part of a laterally contiguous array that spans more than one optical channel.

For example, in one aspect, an optoelectronic module has a plurality of optical channels. The module includes an image sensor including light sensitive regions each of which is associated with a respective one of the optical channels. The module further includes a first laterally contiguous array of first beam shaping elements, each of which is associated with a different respective one of the optical channels. The module also includes one or more second beam shaping elements that are not part of a laterally contiguous array spanning more than one of the optical channels. Each of the one or more second beam shaping elements is associated with a respective one of the optical channels.

In some implementations, the module includes a laterally contiguous lens array combined with a laterally non-contiguous array of lenses. For example, in some implementations, a laterally contiguous array of lenses includes multiple lenses formed together with a common body portion as a single injection molded monolithic piece; in other implementations, a laterally contiguous array of lenses includes multiple replicated lenses on a common transparent substrate, e.g. cover glass. In some cases, a laterally non-contiguous array of lenses includes individual injection molded lenses that are separate from other lenses in the same non-contiguous array. In other cases, the laterally non-contiguous array of lenses includes lenses replicated, respectively, on individual transparent substrates that are laterally separated from one another. Further, in some cases, the beam shaping elements in a particular array (contiguous or non-contiguous) are substantially co-planar with other beam shaping elements in the same array. In other cases, the beam shaping elements in a particular array may not be substantially co-planar with other beam shaping elements in the same array. Although lenses are described as particular example of the beam shaping elements, some implementations include other types of beam shaping elements.

In another aspect, an optoelectronic module has three optical channels. The module includes an image sensor including light sensitive regions each of which is associated with a respective one of the optical channels. The module has a first contiguous 3×1 array of first beam shaping elements, each beam shaping element being disposed in a different respective one of the optical channels. The module also includes a second beam shaping element that is disposed in a middle one of the optical channels. Such an arrangement can be advantageous, for example, in a camera assembly that includes a high-resolution primary camera and two secondary cameras that provide additional information that can be used to generate a depth map.

Various implementations can provide one or more of the following advantages. For example, by forming the arrays that are closer to the bottom of the stack as monolithic pieces, the overall footprint of the package can be made smaller. To provide the strict alignment and manufacturing tolerances that may be needed for some applications, the arrays closer to the top of the stack can be composed of individual beam shaping elements that are separate from other beam shaping elements in the same array. In some cases, better alignment can be achieved. Although the lateral positions of the lenses within a given contiguous lens array are fixed, the lateral positions of the individual lenses are not fixed with respect to the other lenses on the same lateral array.

In another aspect, the arrays of beam shaping elements include various alignment features that facilitate alignment of the different arrays.

Various examples are described in greater detail below. Other aspects, features and advantages will be readily apparent from the following detailed description, the accompanying drawings and the claims.

DETAILED DESCRIPTION

Figure 1:
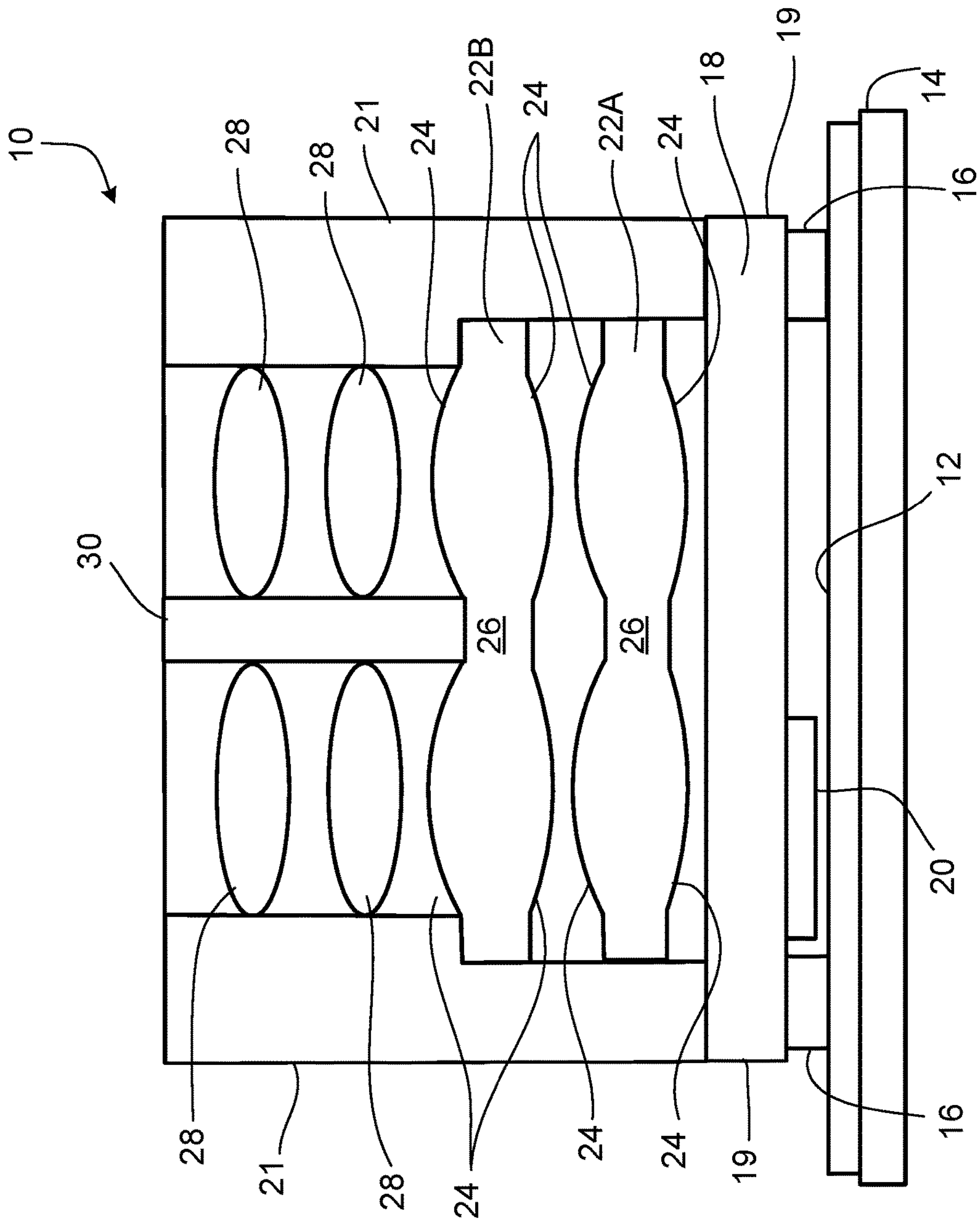
FIG. 1 illustrates an example of a cross-sectional side view of a hybrid lens array package.

The present disclosure describes optoelectronic modules (e.g., hybrid lens array packages) that include different types of beam shaping elements such as lenses or lens arrays. For example, in some implementations, a hybrid lens array package includes two or more arrays of beam shaping elements stacked one above another. Each array can include multiple beam shaping elements. In some cases, the beam shaping elements of each array are substantially co-planar with one another; however, in other instances, the beam shaping elements of at least one of the arrays may not be substantially co-planar with other beam shaping elements in the same array. The size of the arrays can depend on the application. Examples of the size of each array are 1×2, 2×1, 3×1, 2×2 and 4×4. Other implementations may use arrays of other sizes.

Examples of the beam shaping elements that form the arrays include, but are not limited to, various optical elements. The optical elements may be, for example, passive elements such as lenses (e.g., diffractive or refractive). Other types of lenses also may be used (e.g., photochromatic lenses, as well as other types of transformable or dynamic lenses). In some implementations, the beam shaping elements may include optical filters. The beam shaping elements for different arrays in the stack may differ from one another. Thus, although the examples discussed in detail below illustrate lenses as the beam shaping elements, other implementations may incorporate different types of beam shaping elements.

The module can have multiple optical channels, each of which includes at least one beam shaping element (e.g., lens) that is part of a contiguous array. Each optical channel is associated with a respective light sensitive region of the image sensor 12. Some or all of the channels also can include at least one beam shaping element (e.g., lens) that is not part of a laterally contiguous array. In some implementations, the hybrid lens array package includes a contiguous lens array combined with a laterally non-contiguous array of lenses. As explained in greater detail below, in some implementations, a contiguous array of lenses includes multiple lenses formed together with a common body portion as a single injection molded monolithic piece; in other implementations, a contiguous array of lenses includes multiple replicated lenses on a common transparent substrate. In some cases, a laterally non-contiguous array of lenses includes individual injection molded lenses that are laterally separated from other lenses in the same non-contiguous array. In other cases, the non-contiguous array of lenses includes lenses disposed, respectively, on individual transparent substrates that are separated from one another. As will be apparent from some of the examples described in greater detail below, in some instances, a beam shaping element that forms part of a laterally non-contiguous array of beam shaping elements may nevertheless be contiguous with one or more beam shaping elements in the same optical channel (i.e., along the same optical axis).

Further, in some cases, the beam shaping elements in a particular array (contiguous or non-contiguous) are substantially co-planar with other beam shaping elements in the same array. In other cases, the beam shaping elements in a particular array may not be substantially co-planar with other beam shaping elements in the same array. Particular examples of hybrid lens array packages are described in greater detail below.

FIG. 1 illustrates an example of a hybrid lens array package 10 that includes at least one laterally non-contiguous array of individual injection molded lenses (i.e., an array of lenses, none of which is part of a laterally contiguous array spanning more than one optical channel) and at least one contiguous array of injection molded, lenses. As shown in the example of FIG. 1, an image sensor 12 formed on the surface of a support substrate 14 (e.g., a printed circuit board (PCB)) serves as the bottom of a housing of the package. The image sensor 12, which can be implemented, for example, as CMOS or CCD sensors, detects light entering the lens array package 10. The sensors can be arranged, for example, as a one-dimensional (1×N) or two-dimensional (M×N) arrangement of sub-cameras (e.g., 2×2, 3×3, 4×4, etc.). Data from the sub-cameras then can be combined, for example, by a processing unit (e.g., a microprocessor), which can include hardware and/or software, to generate a single high-quality image. The lens array package can be incorporated into an image capturing device such as a multi-channel array camera. The lens array package 10 and its associated processing unit can be mounted, for example, on a common printed circuit board.

A transparent substrate 18 is disposed over the sensor 12, which can be attached to the cover 18 by a spacer 16. The spacer 16 can be attached, for example, to an inactive part of the sensor 12. The spacer 16 thus vertically separates the substrate 18 from the substrate 14 and from the photosensitive areas of the image sensor 12. The substrate 18, which can be composed, for example, of a glass or polymer material, is transparent to the wavelength(s) of light that the sensor 12 is designed to detect (e.g., infra-red (IR) or visible (RGB)). In some cases, optical filters may be provided in one or more of the optical channels to allow only incoming light of specified wavelength(s) to pass. The filters can allow different channels to detect different respective wavelengths of light. In some implementations, the thickness of the substrate 18 may vary from one channel to the next so as to provide for focal length adjustment (e.g., correction) for some of the channels. Alternatively, as shown in FIG. 1, in some instances, one or more layer(s) 20 may be added selectively to parts of the substrate 18 so as to effectively increase the thickness of the substrate 18 for some channels, thereby providing for focal length adjustment. For example, the layer 20 can be provided in one or more channels to provide FFL correction. The thickness of the layer(s) 20 may vary from one channel to the next, and some channels may not include the layer(s) 20 (e.g., if focal length correction is not required for those channels).

The lens arrays can be placed in a lens barrel assembly 21, which can be attached to the object-side of the substrate 18. In the illustrated example of FIG. 1, multiple arrays of lenses are placed in the lens barrel assembly 21. The lens arrays are vertically stacked one over the other such that each optical channel includes multiple lenses substantially aligned with one another. The lenses in a given channel focus incoming light onto a corresponding part of the sensor 12. As shown in the example of FIG. 1, each of the lens arrays closer to the image sensor 12 is formed as a monolithic piece that spans across all the channels. In contrast, the upper lens arrays are composed of individual lenses, each of which is separate from other lenses in the same lateral array. Some implementations may include fewer arrays than the example of FIG. 1, and other implementations may include an even greater number of vertically stacked arrays.

In some applications, image quality tends to be less sensitive to the dimensions and alignment of the lenses closer to the bottom of the lens stack (i.e., the lenses closer to the sensor 12). By forming the lens arrays that are closer to the bottom of the stack as monolithic pieces, the overall footprint of the package 10 can be made smaller, since adjacent lenses in the same array can be placed closer to one another. Thus, although such lens arrays may have relatively large manufacturing tolerances and/or less than optimal alignment, it can be advantageous to provide monolithic arrays at the bottom of the lens stack. On the other hand, to provide the strict alignment and manufacturing tolerances that may be needed for some applications, the arrays closer to the top of the stack can be composed of individual lenses 28 that are laterally separate from other lenses in the same lateral array. Better alignment can be achieved because, although the lateral position of the lenses within the same monolithic lens array is fixed, the lateral position of the single lenses are not fixed with respect to the other lenses in the same lateral array. The stack thus can include two or more lens arrays, at least one of which is a laterally contiguous array formed, for example, as a monolithic piece and at least one of which is composed of one or more lenses that are not part of a laterally contiguous array. Preferably, the stack includes at least three lens arrays stacked one above the other.

As illustrated in the example of FIG. 1, each monolithic piece 22A, 22B can include a respective array of lenses 24 on one or both sides of a body portion 26. Thus, as illustrated in FIG. 1, the monolithic piece 22A includes a first array of lenses 24 on its sensor-side and a second array of lenses 24 on its object-side. Likewise, the monolithic piece 22B includes a first array of lenses 24 on its sensor-side and a second array of lenses 24 on its object-side. The monolithic pieces 22A, 22B can be composed, for example, of a molded polymer or plastic material. The monolithic pieces 22A, 22B (including the lenses 24) can be formed, for example, by injection molding. In the illustrated example, laterally non-contiguous arrays of individual lenses 28 are disposed on the object-side of the laterally contiguous lens arrays. Each laterally non-contiguous array includes multiple lenses 28 that are substantially co-planar with other lenses in the same array, but that are separate from other lenses in the same laterally non-contiguous array. The lenses 28 also can be composed of a molded polymer or plastic material and can be formed, for example, by injection molding.

As further shown in the example of FIG. 1, a portion 30 of the lens barrel assembly 21 laterally separates adjacent lenses 28 from one another.

The spacer 16 and sides of the lens barrel assembly 21 can serve as walls of the package 10. In some implementations, the spacer 16 and lens barrel assembly 21 are composed, respectively, of materials that are substantially opaque to wavelengths of light detectable by the photosensitive regions of the sensor 12. For example, the spacer 16 and/or lens barrel assembly 21 can be composed of polymer materials (e.g., epoxy, acrylate, polyurethane, or silicone) containing a non-transparent filler (e.g., carbon black, pigment, or dye). In some implementations, sidewalls 19 of the substrate 18 also can be coated with a material that is substantially opaque to wavelengths of light detectable by the photosensitive regions of the sensor 12. Such features can help reduce the impact of stray light.

The exterior surface of the support substrate 14 can include one or more conductive contacts, which can be coupled electrically to the sensor 12, for example, by way of conductive vias extending through the substrate.

Figure 2:
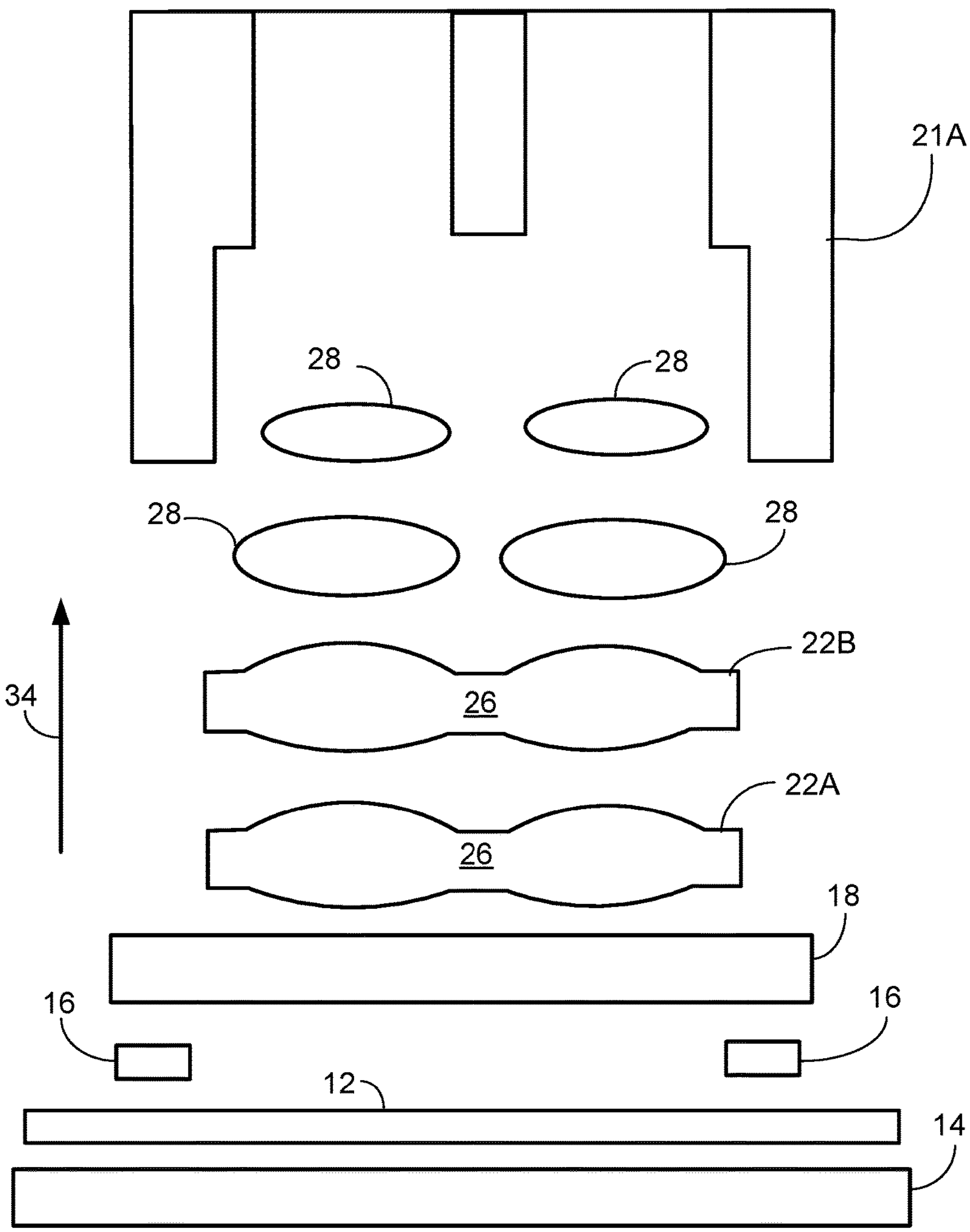
FIG. 2 illustrates an example of assembly of a hybrid lens array package.

In some implementations, the lens barrel assembly is composed of a single unitary lens barrel 21A, as shown in FIG. 2. In such instances, the lenses 28 and monolithic pieces 22A, 22B can be inserted serially into the lens barrel 21A, as indicated by the arrow 34. The substrate 18, spacer 16 and support substrate 14 then can be attached 21A to complete the lens array package 10.

Figure 3:
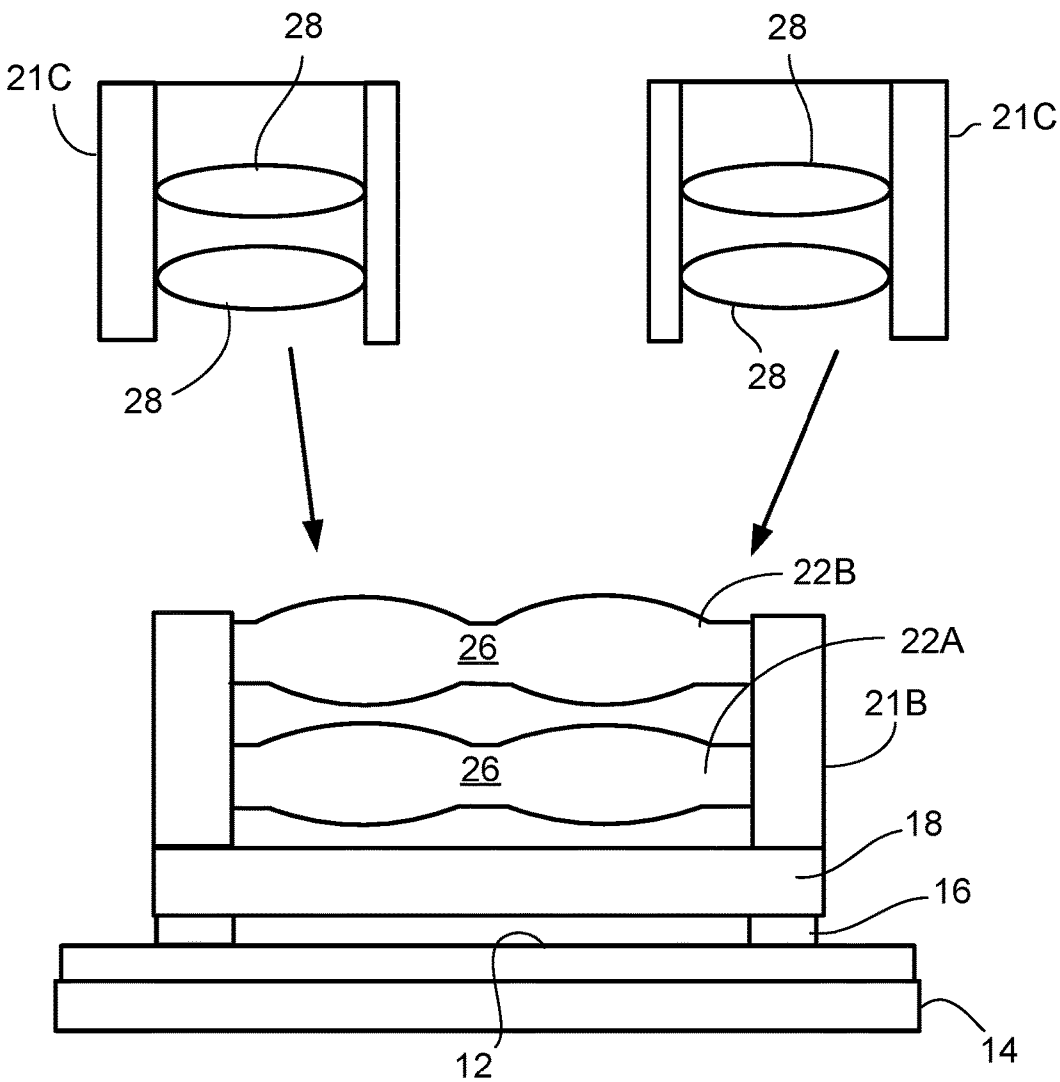
FIG. 3 illustrates another example of assembly of a hybrid lens array package.

In other implementations, instead of a single unitary lens barrel, multiple lens barrels are used for different sub-groups of the lenses. As shown in the example of FIG. 3, the laterally contiguous lens arrays, composed of the monolithic pieces 22A, 22B, are placed in a first lens barrel 21B. This lens barrel 21B can be attached to the top of the substrate 18, which in turn is attached to the support substrate 14 by way of the spacer 16. The individual lenses 28 for the upper arrays can be placed into respective lens barrels 21C. Thus, a separate lens barrel 21C can be provided for each respective optical channel, where a single column of one or more lenses 28 is placed into each of the lens barrels 21C. Accordingly, for a package 10 in which each of the arrays is a 2×2 array, four lens barrels 21C would be provided for the lenses 28. Each lens barrel 21C can be attached to the lens barrel 21B into which the monolithic pieces 22A, 22B are placed such that upper arrays of the lenses 28 are positioned over and substantially aligned with the lower arrays formed of the monolithic pieces 22A, 22B, thereby forming the stack of lens arrays.

Although the implementation of FIG. 2 may be easier to manufacturer in some cases, the implementation of FIG. 3 can be advantageous as well. For example, the implementation of FIG. 3 can facilitate providing FFL correction for the individual lens stacks following their insertion into the lens barrels 21C (e.g., by adjusting the height of the individual lens barrels 21C based on FFL measurements prior to attaching the lens barrels 21C to the lens barrel 21B).

Figure 4:
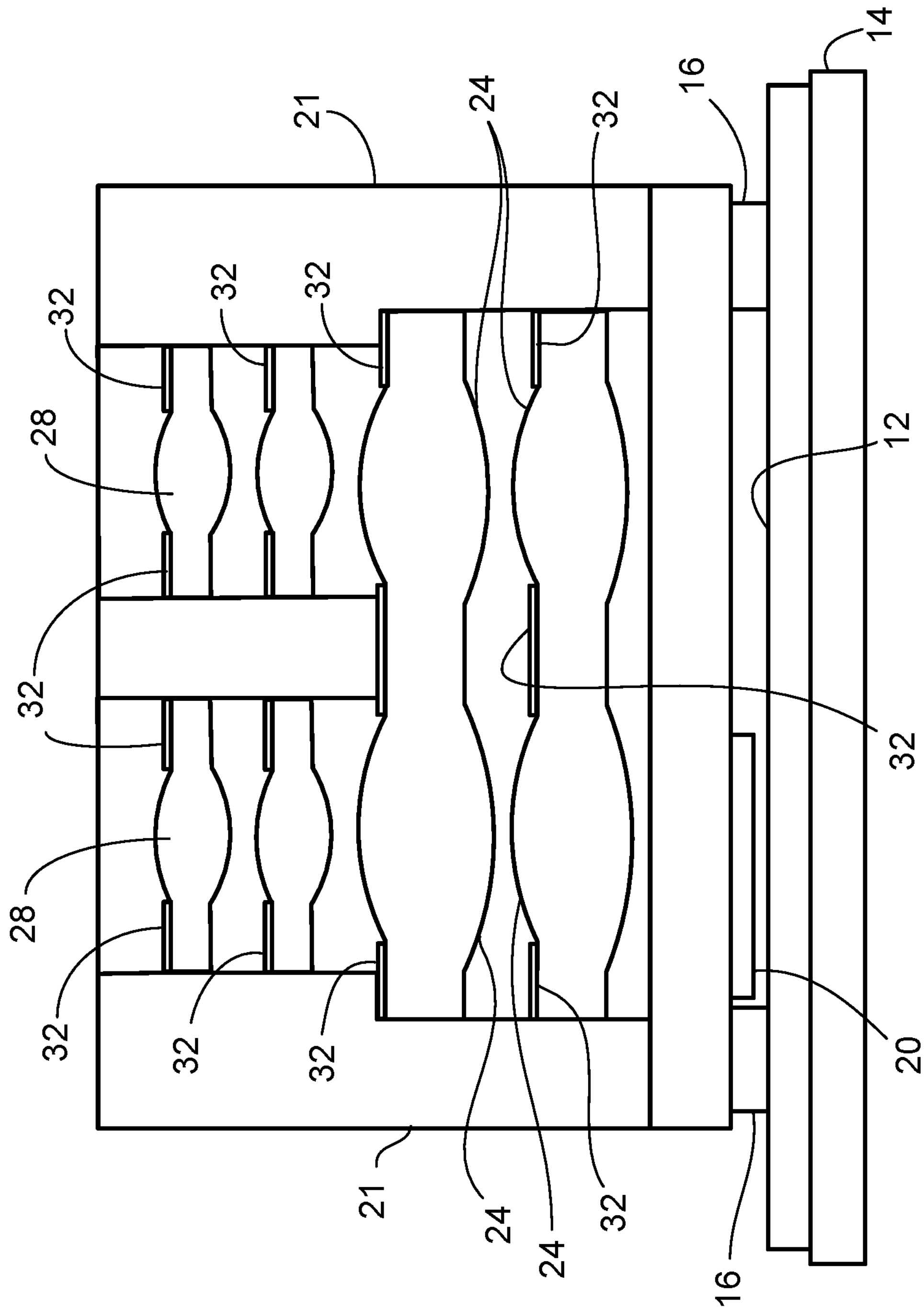
FIG. 4 illustrates another example of a cross-sectional side view of a hybrid lens array package.

In some instances, it may be desirable to add a thin coating 32 of a substantially opaque material on portions of some or all of the lenses 24, 28 and/or the monolithic pieces 22A, 22B that form the lens arrays (see FIG. 4). The coating 32 can help block stray light and may be applied, for example, to optically inactive regions around, or at the periphery of, the lenses 24, 28 or monolithic pieces 22A, 22B. In some implementations, the coating 32 even may be applied to optically active regions of the lenses if those regions are not necessary in order to generate the image of interest in a particular application. The opaque coating 32 can be composed, for example, of black chrome or black plastic foil. Other opaque materials may be appropriate for some applications.

The shape of the individual lenses 24 or 28, when viewed from the object-side of the assembly, may be circular. In other implementations, however, different shapes may be used. For example, it may be desirable for at least one side edge of each of the lenses 24 or 28 to be flat, rather than rounded. For example, some or all of the individual lenses 24, 28 may have a plurality of flat side edges (e.g., a square or rectangular shape). In particular, it may be desirable for the lenses 24, 28 to have a substantially square shape, which can help reduce the overall footprint of the package 10 even further.

As noted above, in some implementations, each laterally contiguous array of lenses can include multiple lenses positioned on a common transparent substrate, and the laterally non-contiguous array of lenses can include lenses positioned, respectively, on individual transparent substrates. The various lenses and lens arrays can be made, for example, as part of a wafer-level replication process. The replication process can include, for example, dispensing tiny micro droplets of liquid polymer onto a glass or other transparent wafer, embossing the polymer with a customized mold, and curing the polymer on the wafer using ultraviolet light to harden it. In this context, a wafer refers to a substantially disk- or plate-like shaped item, its extension in one direction (y-direction or vertical direction) is small with respect to its extension in the other two directions (x- and z- or lateral directions). In some implementations, the diameter of a wafer is between 5 cm and 40 cm, and can be, for example, between 10 cm and 31 cm. The wafer may be cylindrical with a diameter, for example, of 2, 4, 6, 8, or 12 inches, one inch being about 2.54 cm. After replicating the lenses on the wafer, the wafer can be separated (e.g., by dicing) into individual lenses (each of which is on a piece of the wafer (i.e., a substrate)) and/or into contiguous lens arrays (each of which includes multiple lenses on a common piece of the wafer (i.e., a common substrate)).

Before separating the transparent wafer into individual lenses or laterally contiguous lens arrays, spacer wafers can be attached to one, or both, sides of the wafer(s). The spacer wafers provide spacers that facilitate attaching the transparent substrates to one another to form the vertical stack of lens arrays. The spacers can help ensure that there is a well-defined separation between the lens arrays. The spacer wafers can be composed, for example, of a material that is substantially opaque to wavelengths of light detectable by the photosensitive regions of the sensor. Thus, in some cases, the spacer is composed of polymer materials (e.g., epoxy, acrylate, polyurethane, or silicone) containing a non-transparent filler (e.g., carbon black, pigment, or dye).

Figure 5:
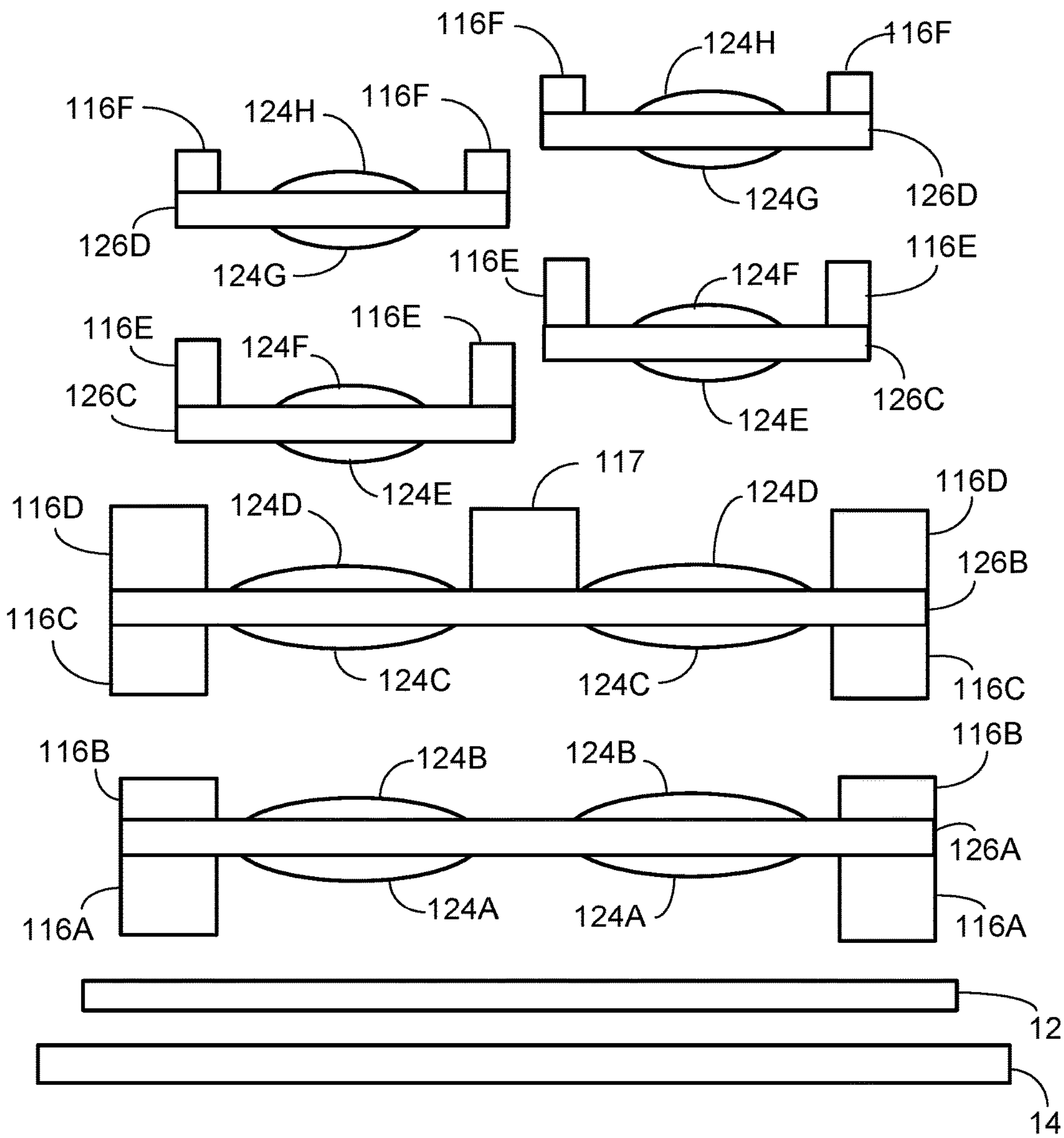
FIG. 5 illustrates an exploded view of an example of a hybrid lens array package.

FIG. 5 illustrates examples of transparent substrates that can be attached to one another, by way of spacers, to form a hybrid lens array stack. In the illustrated example, a first contiguous lens array includes an array of replicated lenses 124A on one side of a first transparent substrate 126A. A second contiguous array of replicated lenses 124B can be replicated on the second side of the transparent substrate 126A. Spacers 116A, 116B are provided on the first and second sides of the transparent substrate 126A and laterally surround the respective lenses 124A, 124B of the first and second arrays. Third and fourth contiguous arrays of replicated lenses 124C, 124D can be provided on opposite sides of a second transparent substrate 126B. Here too, spacers 116C, 116D can be provided on opposite sides of the second transparent substrate 126B and laterally surround the respective lens arrays. The spacer 116D, for example, also can include an inner partition portion 117 that separates the lenses 124D from one another. Although the illustrated example shows lenses replicated on both sides of each transparent substrate 126A, 126B, in some cases, lenses may be present on only one side of the transparent covers.

In addition to the contiguous arrays of lenses, FIG. 5 illustrates examples of replicated lenses on separate individual transparent substrates 126C, 126D. As shown in FIG. 5, lenses 124E, 124F are provided on opposite sides of each transparent substrate 126C. Likewise, lenses 124G, 124H are provided on opposite sides of each transparent substrate 126D. In some implementations, lenses may be provided on only one side of each transparent substrate 126C, 126D. A respective spacer 116E and lens baffle 116F is provided on the object-side of each transparent substrate 126C, 126D. The lens baffle 116F can help block stray light and prevent it from entering the module.

Various modifications are possible. For example, in some instances, an inner partition portion 117 may be provided on the sensor-side of the transparent substrate 126B and/or may be provided on either one or both sides of the transparent substrate 126A. Likewise, the presence or location of the spacers may differ in some implementations. For example, spacers 116A or 116B may be omitted in some cases. Similarly, instead of providing the spacer 116D on the object-side of the transparent substrate 126B, spacers may be provided on the sensor-side of the transparent substrate 126C. Further, in some instances, spacers 116E may be placed on the sensor-side of the transparent substrate 126D. Other modifications are possible as well.

Figure 6:
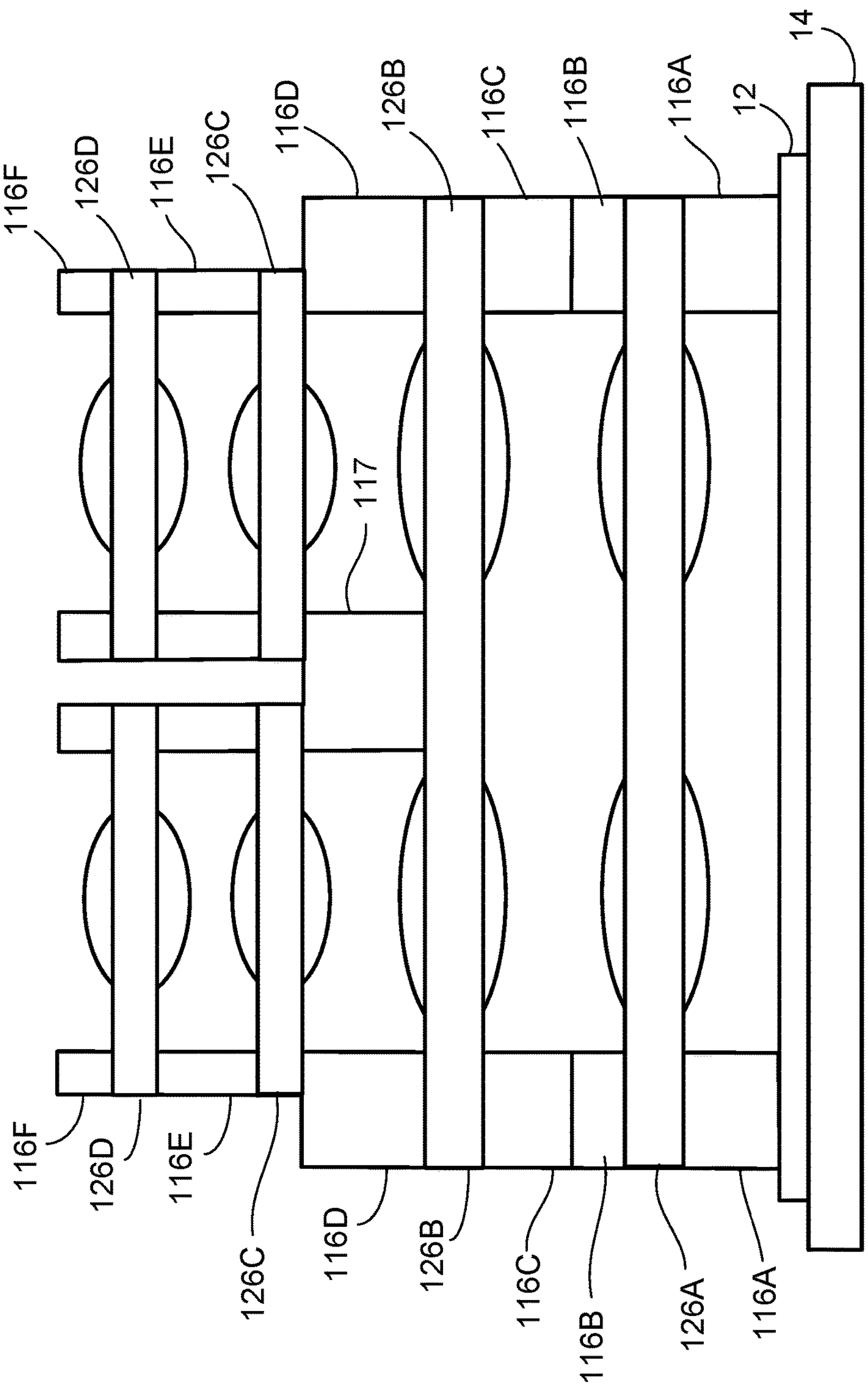
FIG. 6 illustrates an example of a cross-sectional side view of a hybrid lens array package.

The transparent substrate 126A, 126B, 126C, 126D of FIG. 5 then can be attached to one another, by way of the spacers, to form a hybrid stack of lens arrays, as shown in FIG. 6. The lowest spacer 116A separates the stack of lens arrays from the image sensor 12, which is on a PCB or other substrate 14. As illustrated in FIG. 6, the hybrid lens array package includes at least one laterally contiguous lens array combined with at least one laterally non-contiguous array of lenses. In this case, each of the contiguous arrays of lenses includes multiple lenses positioned on a common transparent substrate 126A (or 126B), and each of the laterally non-contiguous array of lenses includes multiple lenses positioned, respectively, on individual transparent substrate 126C (or 126D). In some cases, improved alignment can be achieved. Although the lateral position of the lenses that are attached to a common transparent substrate is fixed, the lateral positions of the single lenses are not fixed with respect to the other lenses in the same lateral array. The implementation illustrated by FIGS. 5 and 6 can obviate the need for a lens barrel.

As noted above, in some instances, a beam shaping element that forms part of a laterally non-contiguous array of beam shaping elements may nevertheless be contiguous with one or more beam shaping elements in the same optical channel (i.e., along the same optical axis). Thus, for example, the lenses on the object-side of the substrates 126D in FIG. 6 form a laterally non-contiguous array of beam shaping elements, even though each of the object-side lenses is contiguous with another lens on the sensor-side of the same substrate.

Figure 7:
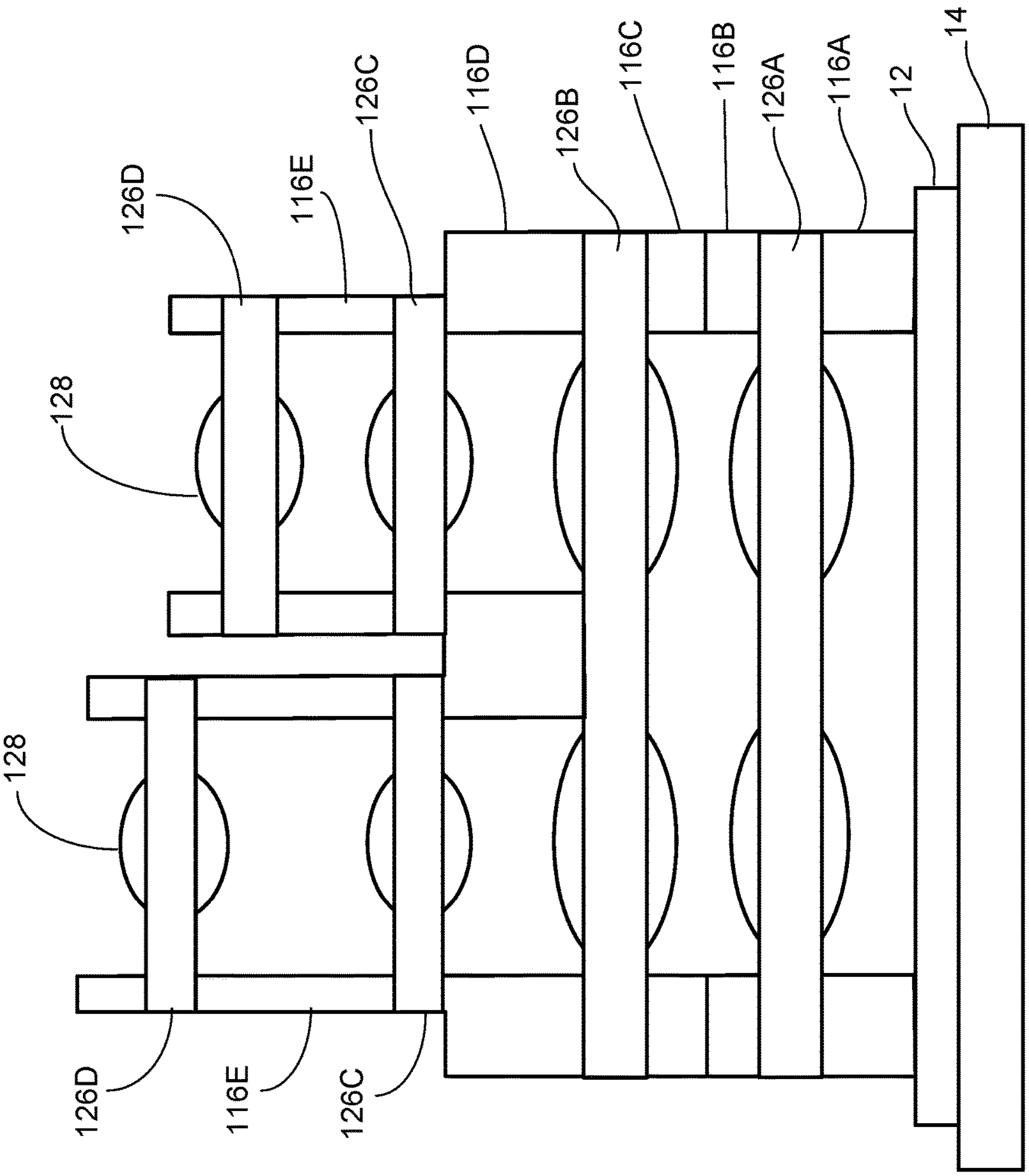
FIG. 7 is a cross-sectional side view showing another example of a hybrid lens array package.

In the illustrated example of FIGS. 1 and 6, the lenses in a given array are displaced laterally from one another, such that each lens array is substantially parallel to the image sensor 12 and such that the lenses in the given array are substantially co-planar with other lenses in the same array. In other implementations, the lenses in at least one of the arrays may not be substantially co-planar with other lenses in the same array. For example, as shown in FIG. 7, the individual lenses 128 that form a non-contiguous array near the top (object-side) of the stack are not substantially co-planar with one another. Instead, the lenses 128 in the top array are offset vertically from one another (i.e., along the direction of the optical axis). This can be accomplished, for example, by providing spacers 116E of different heights for the various optical channels. Also, in the foregoing examples, the lenses in each particular array are substantially parallel to the image sensor 12. However, in some cases, the lenses and transparent substrate in one or more of the non-contiguous arrays may be disposed at an angle such that they are not substantially parallel to the image sensor 12.

Figure 8:
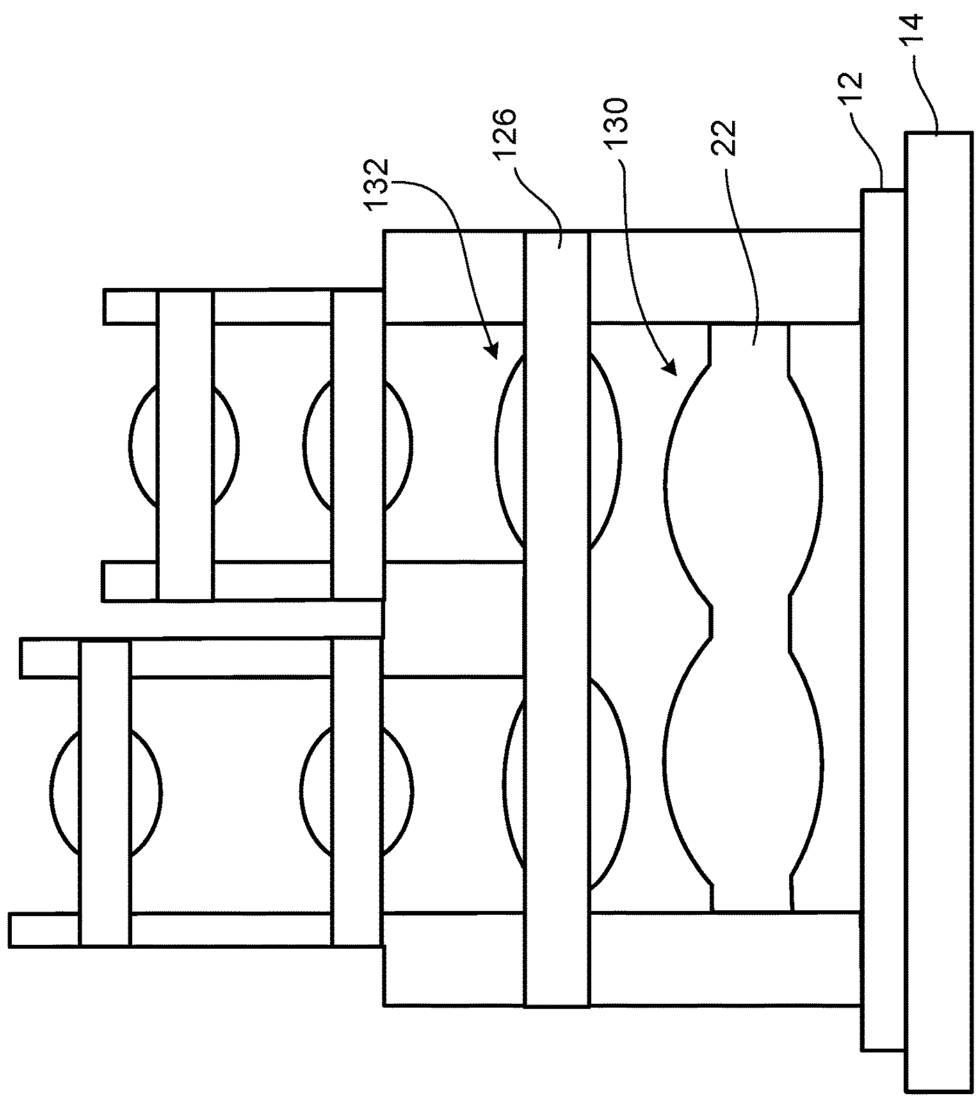
FIG. 8 is a cross-sectional side view showing a further example of a hybrid lens array package.

Each of the foregoing illustrated examples includes more than one contiguous array of lenses, where the contiguous arrays in a particular package are of the same type (e.g., injected molded monolithic pieces that include lenses, or lenses replicated onto a common cover). Some implementations, however, may include different types of contiguous lens arrays in the same package. For example, as shown in FIG. 8, the hybrid lens array package includes a first lens array 130 formed as a transparent injected molded monolithic piece 22 and a second lens array 132 that includes replicated lenses on a common transparent substrate 126. The package of FIG. 8 also includes non-contiguous arrays of lenses stacked over the contiguous arrays of lenses.

In the foregoing examples (e.g., FIGS. 1, 6, 7 and 8), each optical channel includes at least one beam shaping element that is part of a contiguous array and at least one beam shaping element that is part of a non-contiguous array. In some implementations, however, fewer than all of the optical channels may include a beam shaping element that is part of either a non-contiguous or contiguous array.

Figure 9A:
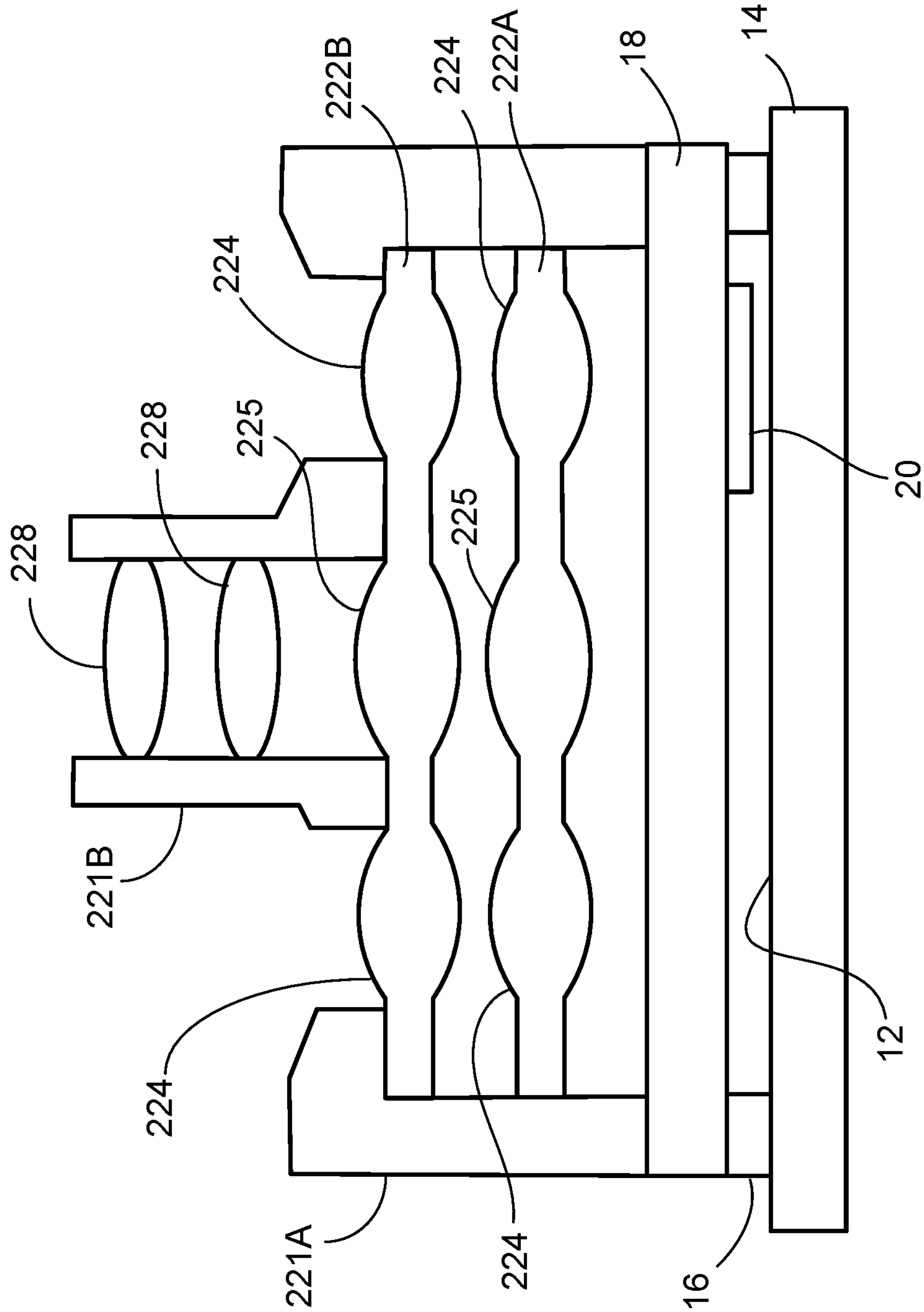
FIGS. 9A and 9B are a cross-sectional side views showing yet further examples of hybrid lens array packages.

For example, as illustrated in FIG. 9A, a hybrid lens array package includes contiguous arrays of beam shaping elements (e.g., monolithic pieces 222A, 222B that include respective arrays of lenses). Each of the contiguous arrays can include multiple lenses 224, 225, which may differ from one another (e.g., in size and/or shape). Thus, in FIG. 9A, each of the contiguous arrays is a 3×1 array of lenses, in which the lenses 224 in the outer optical channels are of a first type and the lens 225 in the center optical channel is of a second type. In the illustrated example of FIG. 9A, individual lenses 228, which do not form part of a contiguous array, are provided for the center optical channel, but not for the outer channels. The contiguous lens arrays can be placed, for example, in a first lens barrel assembly 221A, and the individual lenses 228 can be placed, for example, in a second lens barrel assembly 221B. The second lens barrel assembly 221B can be disposed on the object-side of the center optical channel. Such an arrangement can be advantageous, for example, in a camera assembly that includes a high-resolution primary camera and secondary cameras for depth information. Thus, the center optical channel can be associated with the high-resolution primary camera, whereas the outer optical channels can provide the additional information needed for a depth map.

Figure 9B:
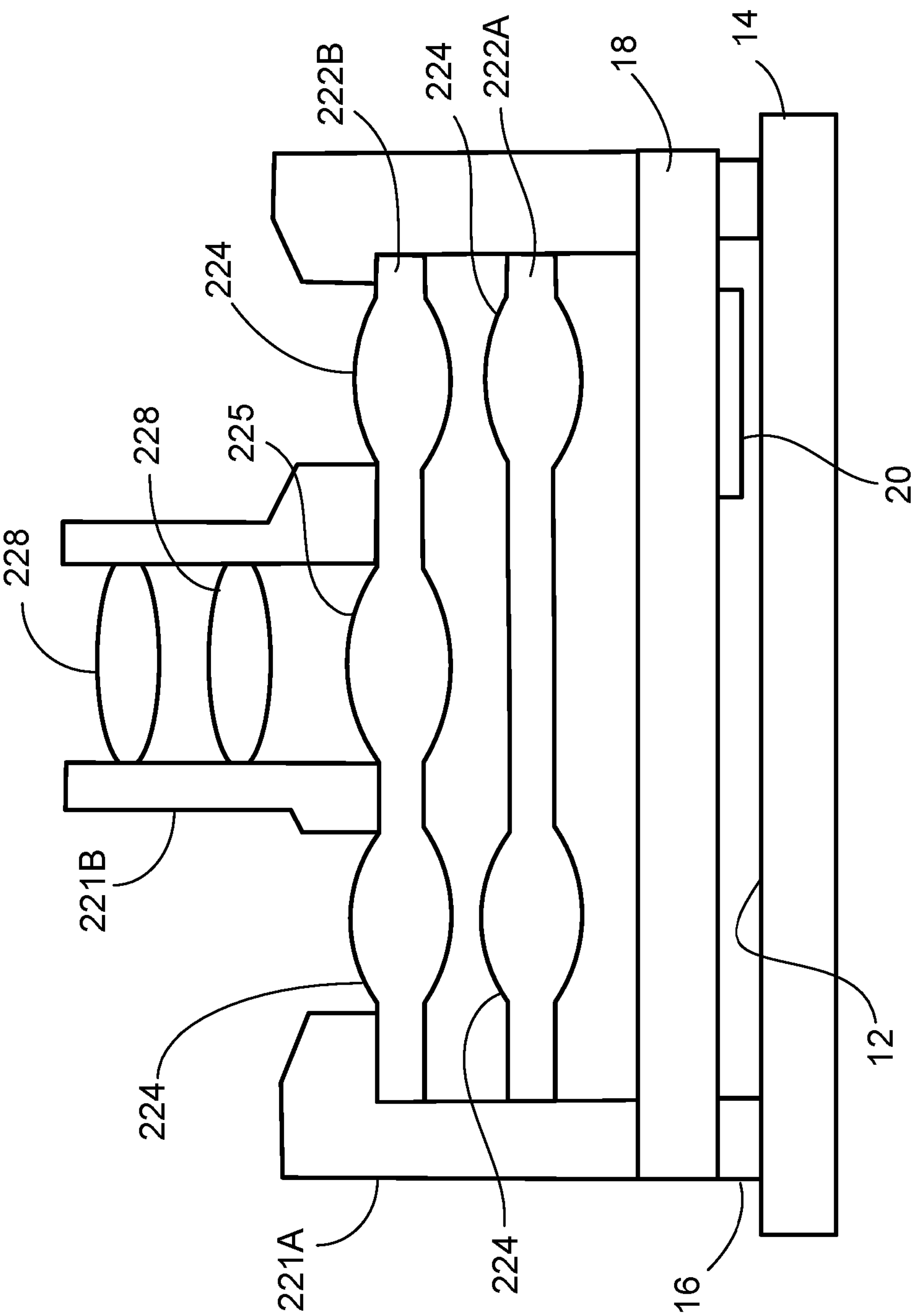

Further, in some instances, a particular contiguous array of beam shaping elements may include a respective beam shaping element for only some, but fewer than all, of the optical channels. An example is illustrated in FIG. 9B, which is similar to FIG. 9A, except that the contiguous array of lenses closest to the image sensor 12 does not include a beam shaping element for the middle channel.

In some implementations, the arrays of beam shaping elements include various alignment features that facilitate alignment of the different arrays with one another. Such alignment features can be readily incorporated, for example, into injection molded arrays of lenses or other beam shaping elements.

Figure 10A:
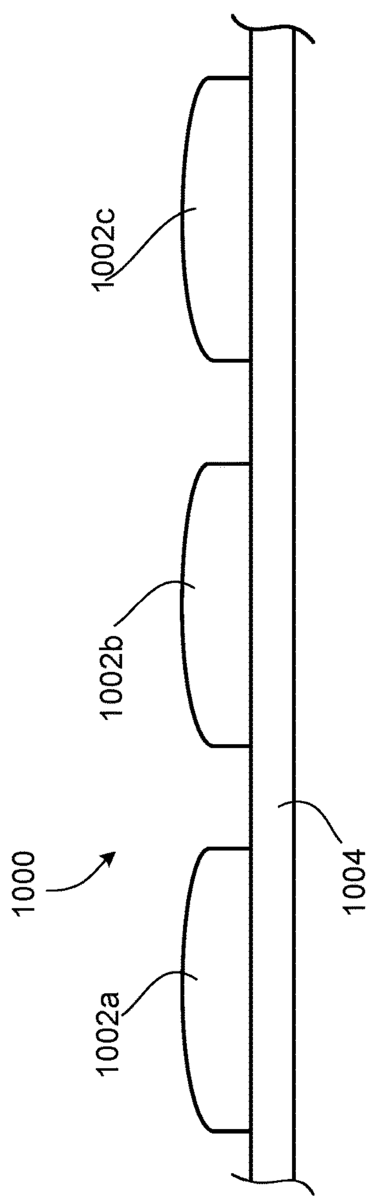
FIGS. 10A-B illustrate cross-sectional views of an example contiguous array of beam shaping elements.

A cross-sectional view of an example contiguous array 1000 of beam shaping elements 1002*a-c* is shown in FIG. 10A. In addition to beam shaping elements 1002*a-c*, array 1000 includes one or more body portions 1004 that provide spacing and/or support for optical elements 1002*a-c*. Array 1000 can be integrated as part of a package of arrays, for instance as a part of one or more of the example array packages described above. In this example, array 1000 is integrally formed (e.g., through injection molding), such that beam shaping elements 1002*a-c* and body portions 1004 are formed as a single monolithic element. As described above, each beam shaping element 1002*a-c* of the array 1000 may be, for example, optical elements such as lenses (e.g., diffractive, refractive, photochromatic, transformable, and/or dynamic lenses). In some implementations, each optical element 1002*a-c* of the array 1000 can be different (e.g., have different dimensions or different light shaping capabilities). In some implementations, two or more of the optical elements can be similar (e.g., have similar dimensions or similar light shaping capabilities).

Figure 10B:
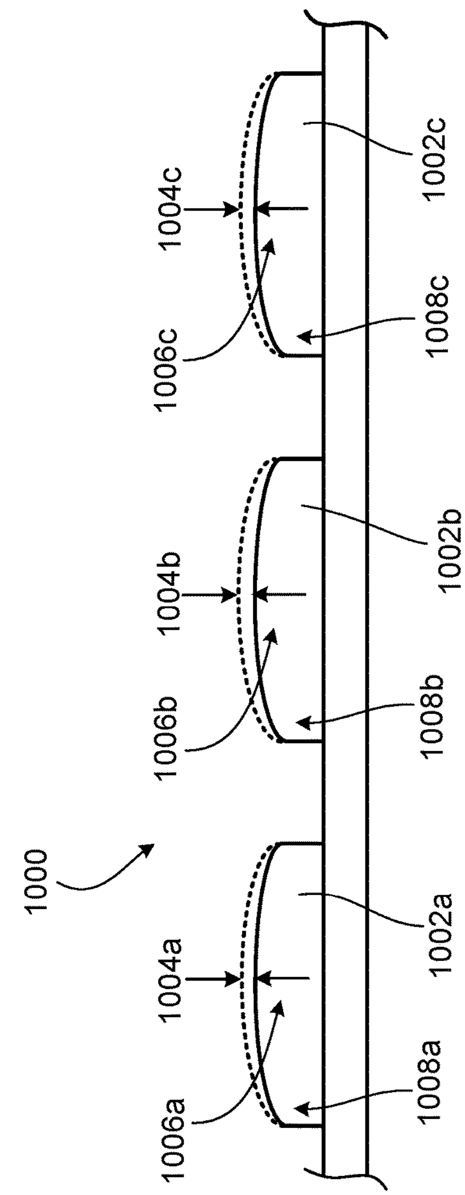

In some implementations, array 1000 may exhibit dimensional variations. For example, as shown in FIG. 10B, array 1000 may exhibit dimensional variations 1004*a-c* for each of the optical elements 1002*a-c* of array 1000. These dimensional variations 1004*a-c* can be the result, for example, of the injection molding process, and may be dependent on many factors including, for example, lens shape, lens surface area, processing conditions, lens-material physical properties, and volume of lens material used. In some implementations, the maximum dimension variation might occur relatively predictably. For example, referring to FIG. 10B, the maximum dimensional variation might occur predominantly in regions of maximum thickness 1006*a-c*. Likewise, in some implementations, a relatively smaller degree of dimensional variation might occur in regions of comparatively reduced thickness, for example at or near the outer periphery 1008*a-c* of each optical element 1002*a-c* of the array 1000.

Figure 11A:
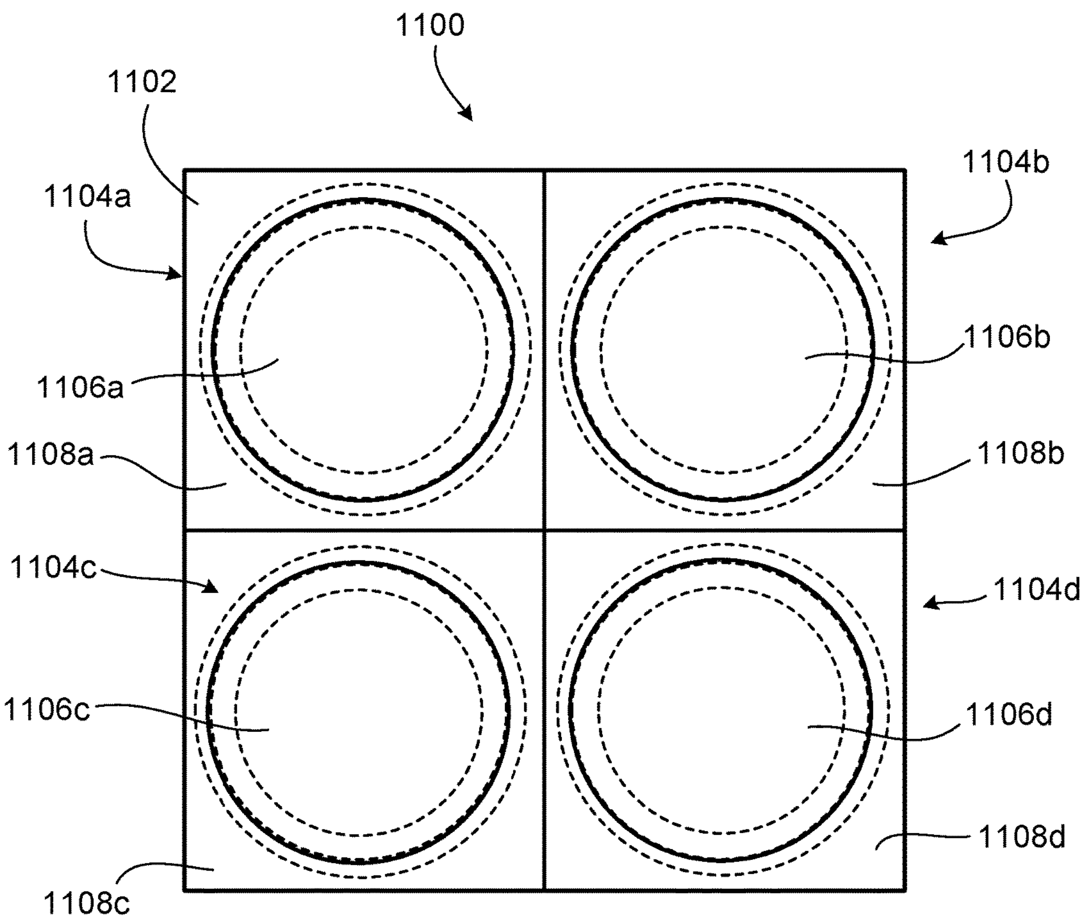
FIG. 11A illustrates an overhead view of another example contiguous array of beam shaping elements.

FIG. 11A shows an overhead view of another example laterally contiguous array 1100 of optical elements. Array 1100 includes a 2×2 array of optical elements 1104*a-d*. Array 1100 also includes one or more body portions 1102 that provide spacing and/or support for optical elements 1104*a-c*. As with array 1000, array 1100 is integrally formed (e.g., through injection molding), such that beam shaping elements 1104*a-d* and body portions 1102 are formed as a single monolithic element. While a 2×2 array is shown in FIG. 11A, as described above, the size of an array is not limited to 2×2, and can differ depending on the implementation. Each optical element 1104*a-d* includes an optically active area 1106*a-d*, respectively (e.g., an area through which light is shaped and transmitted), and an optically inactive area 1108*a-d*, respectively (e.g., an area through which light is not substantially transmitted, refracted, diffracted or shaped by the optical element) at the periphery of each optical element. Body portions 1102 are also optically inactive.

Figure 11B:
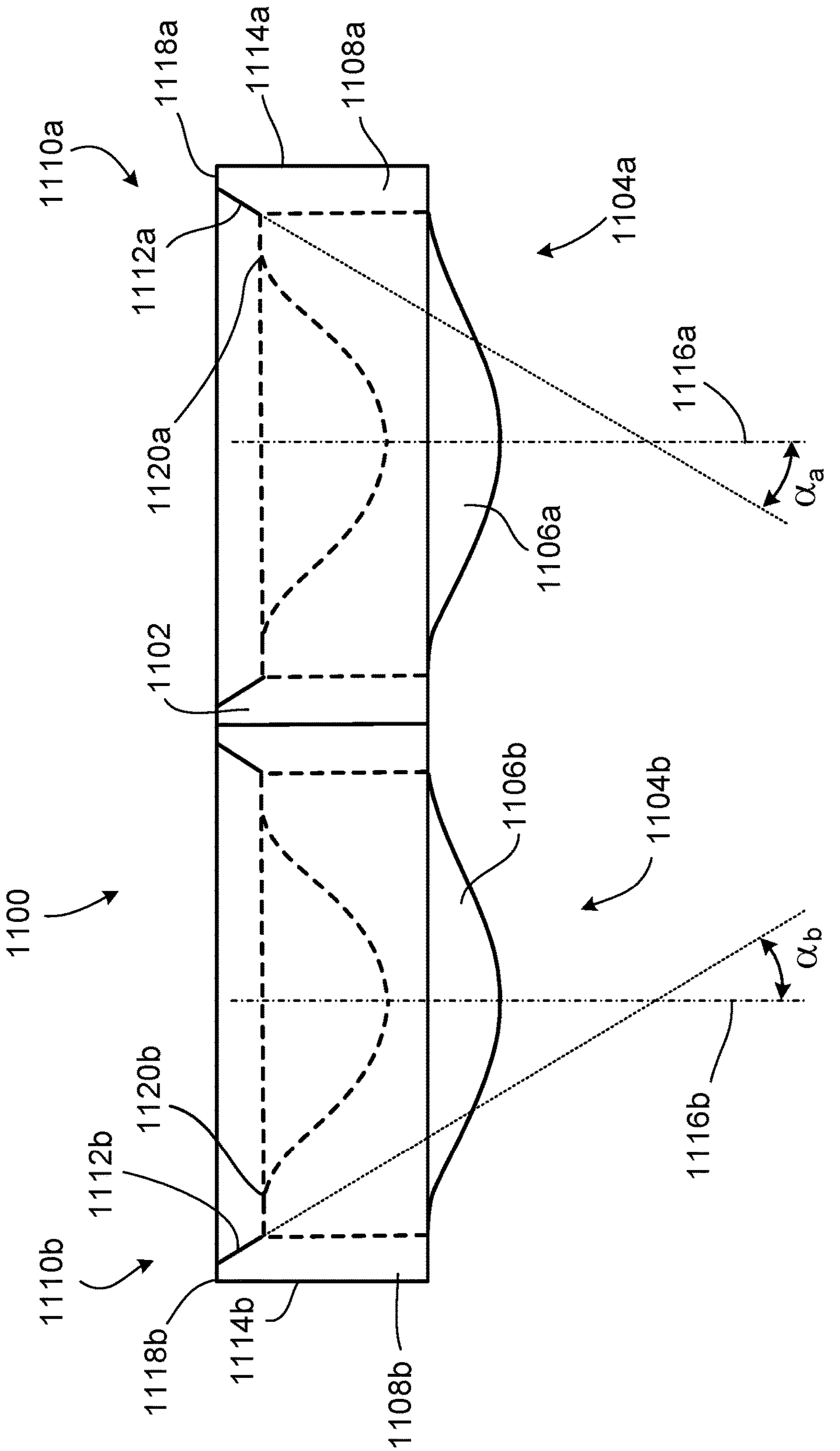
FIG. 11B illustrates a cross-section view of the array of FIG. 11A.

A cross-sectional view of array 1100 is shown in FIG. 11B (including optical elements 1104*a-b*). Array 1000 includes an alignment guide 1110*a-d* (alignment guides 1110*a-b* shown) positioned in optically inactive areas 1108*a-d* (optically inactive areas 1108*a-b* shown), respectively. Each alignment guide 1110*a-d* (alignment guides 1110*a-b* shown) includes a respective recession surface 1112*a-d* (recession surfaces 1112*a-b* shown) and a respective peripheral surface 1114*a-d* (peripheral surfaces 1114*a-b* shown). Each recession surfaces 1112*a-d* is inclined relative to an optical axis 1116*a-d* (optical axes 1116*a-b* shown), respectively, by an angle $\alpha_{a-d}$. Each alignment guide 1110*a-d* also includes a respective peripheral surface 1118*a-d* (peripheral surfaces 1118*a-b* shown) and a respective recession surface 1120*a-d* (recession surfaces 1120*a-b* shown). In some implementations, each angle $\alpha_{a-d}$ is the same. In some implementations, one or more angles $\alpha_{a-d}$ can differ from one or more other angles $\alpha_{a-d}$.

As described above, a laterally contiguous array of lenses can be stacked with another array of lenses (e.g., another laterally contiguous array of lenses or an array of individually formed lenses), such that an optical channel is formed by each stack of aligned lenses. As also described above, in some cases, dimensional variation might be greater in laterally contiguous lens arrays (e.g., a lens array formed as a monolithic piece) compared to arrays of individually formed, laterally non-contiguous lenses. Accordingly, laterally contiguous lens arrays and array of individually formed, laterally non-contiguous lenses can be stacked in particular combinations and positions in order to compensate for these dimensions variations without resulting in appreciable degradation of optical performance.

Figure 12A:
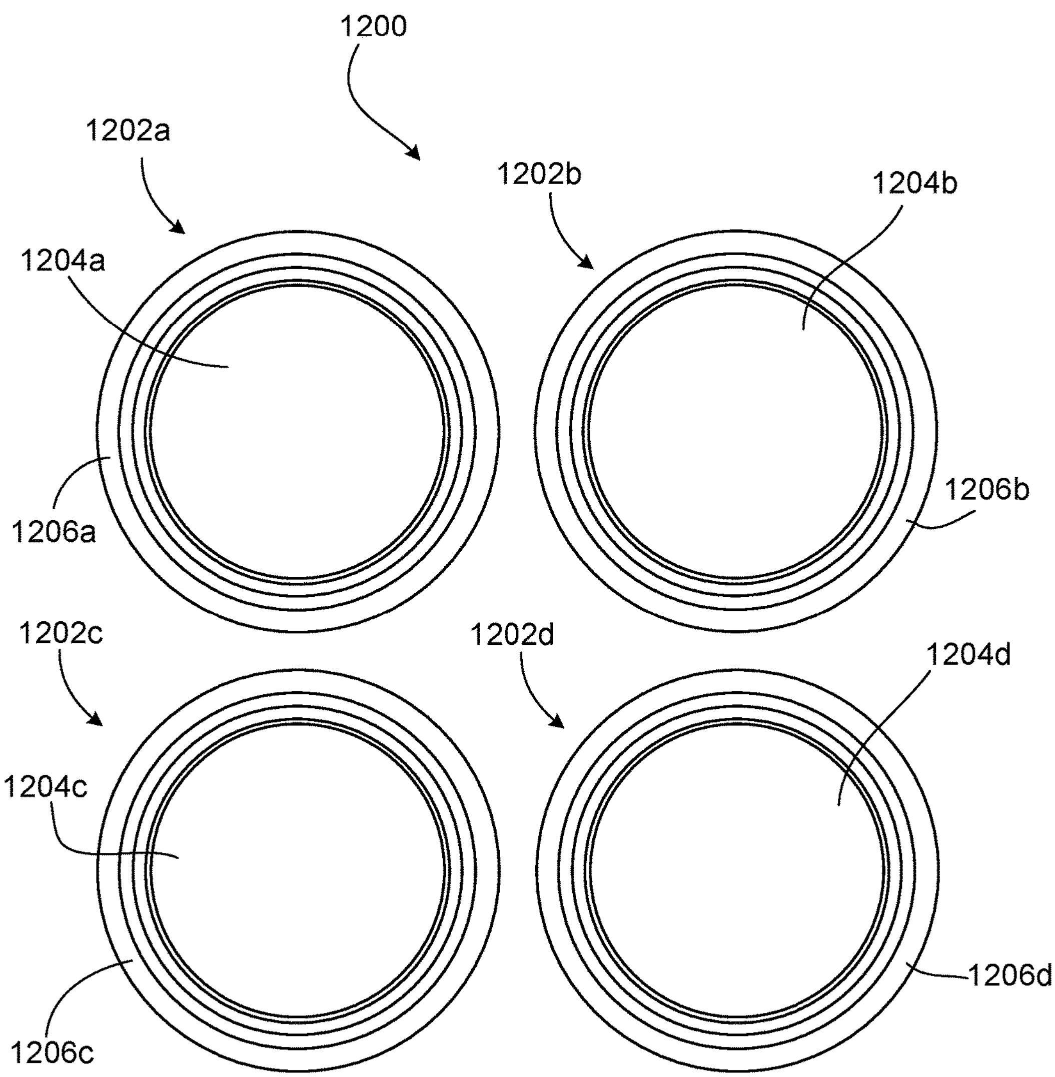
FIG. 12A illustrates an overhead view of an example array of single lenses.
Figure 12B:
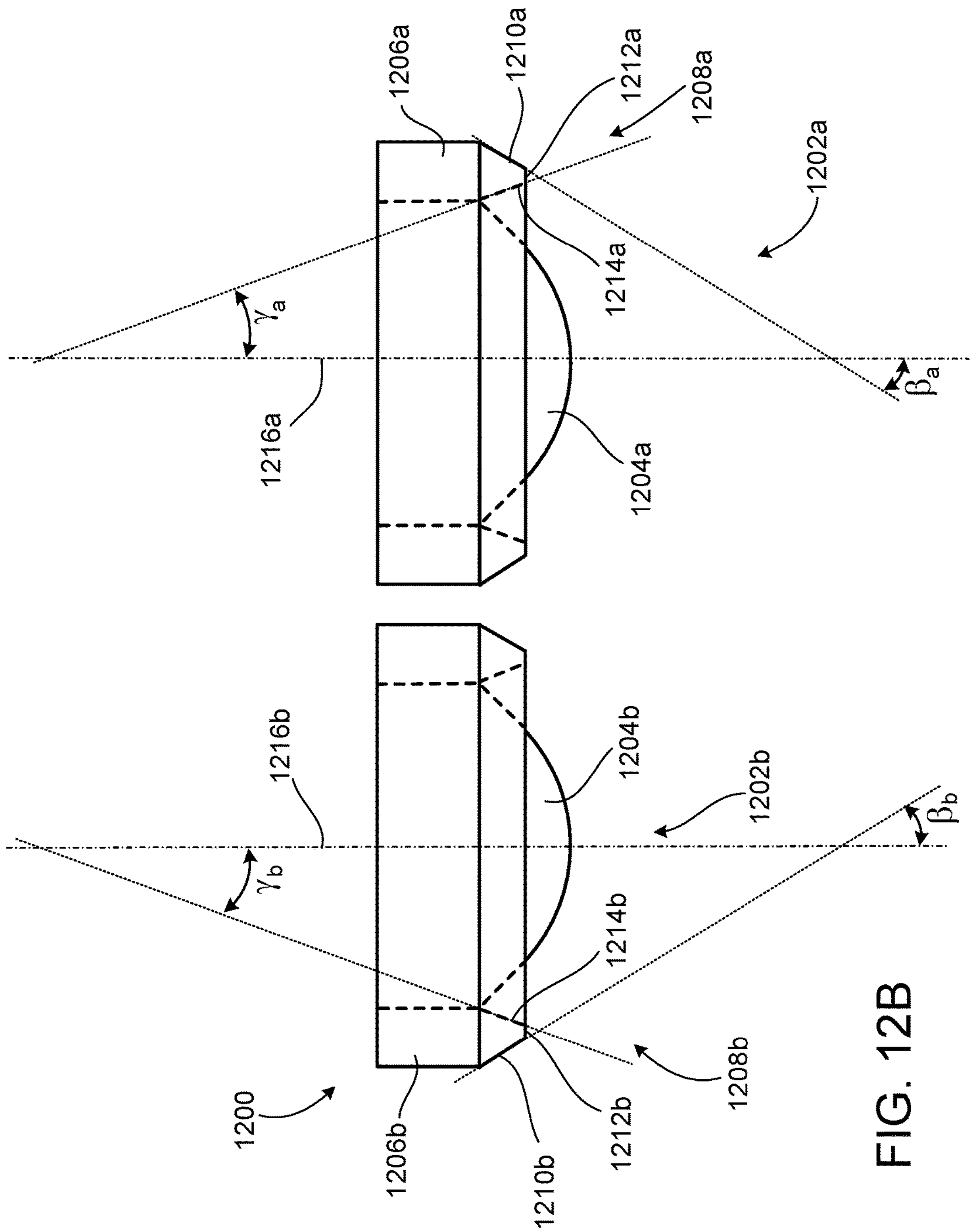
FIG. 12B illustrates a cross-section view of the array of single lenses of FIG. 12A.

FIG. 12A shows an example array 1200 of single lenses that are not part of a laterally contiguous array. Array 1200 includes several single lenses 1202*a-d*, where each individual lens 1202*a-d* includes a respective optically active area 1204*a-d* and a respective optically inactive area 1206*a-d* at the periphery of each lens. FIG. 12B shows a cross-sectional view of array 1200 (including lenses 1202*a-b*). As shown in FIG. 12B, each lens 1202*a-d* also includes a respective alignment guide 1208*a-d*. Each alignment guide 1208*a-d* includes a respective exterior projection surface 1210*a-d*, a respective projection cap surface 1212*a-d*, and a respective interior projection surface 1214*a-d*. Each exterior projection surface 1210*a-d* is inclined relative to the optical axis 1216*a-d*, respectively, by an angle $\beta_{a-d}$, respectively, and each interior projection surface 1214*a-d* is inclined relative to the optical axis 1216*a-d*, respectively, by an angle $\gamma_{a-d}$. In some implementations, each angle $\beta_{a-d}$ is the same. In some implementations, one or more angles $\beta_{a-d}$ can differ from one or more other angles $\beta_{a-d}$. Likewise, in some implementations, each angle $\gamma_{a-d}$ is the same. In some implementations, one or more angles $\gamma_{a-d}$ can differ from one or more other angles $\gamma_{a-d}$.

When two or more arrays of lenses (e.g., arrays 1100 and 1200) are stacked one over the other, the alignment guides of each array (e.g., alignment guides 1110*a-d* and 1208*a-d*) can provide alignment between the lenses of the different arrays, such that optical channels are formed by each stack of aligned lenses.

Figure 13A:
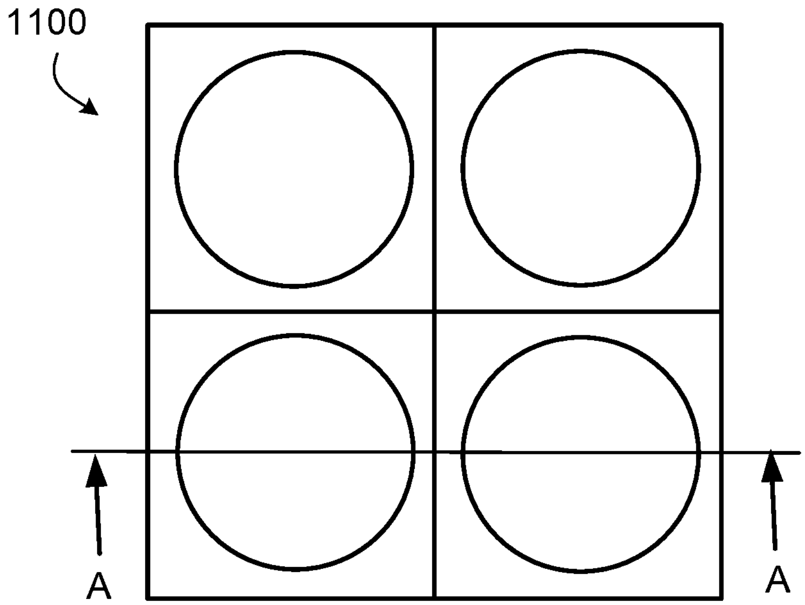
FIG. 13A illustrates an overhead view of the contiguous array of FIGS. 11A-B stacked with the array of single lenses of FIGS. 12A-B.
Figure 13B:
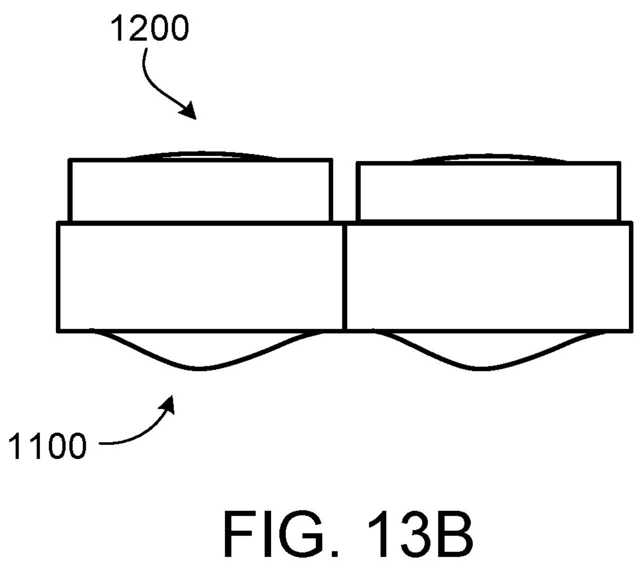
FIG. 13B illustrates a side view of the contiguous array of FIGS. 11A-B stacked with the array of single lenses of FIGS. 12A-B.
Figure 13C:
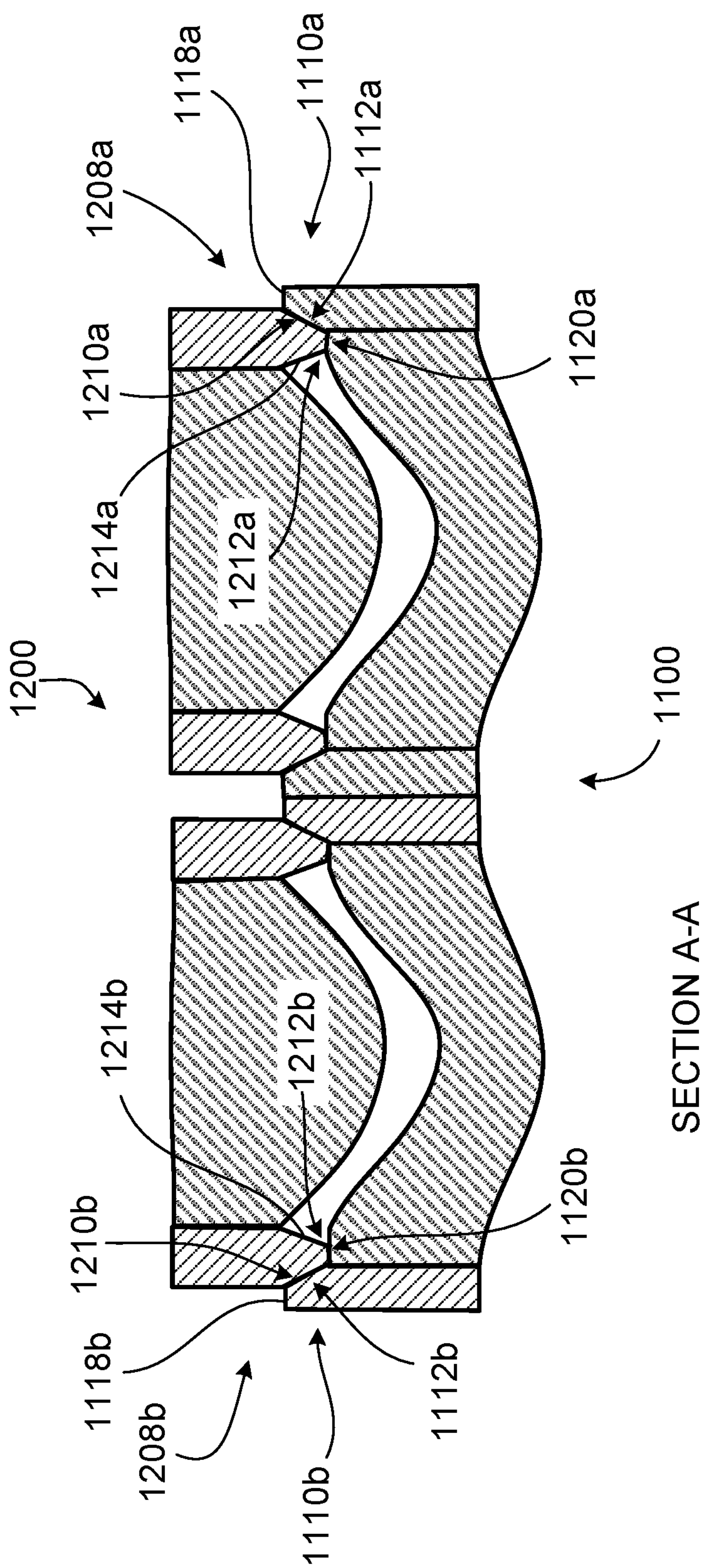
FIG. 13C illustrates a cross-sectional view of the contiguous array of FIGS. 11A-B stacked with the array of single lenses of FIGS. 12A-B.

An example of this stacking is shown in FIGS. 13A-C, depicting an overhead view (FIG. 13A), a side view (FIG. 13B), and a cross-sectional view (FIG. 13C) of two stacked arrays. In this example, array 1200 has been inserted into the object side of array 1100 (e.g., the side facing an object), such that array 1200 is stacked on the object side of array 1100. In this arrangement, the lenses of arrays 1100 and 1200 are aligned, forming optical channels from each stack of aligned lenses.

As shown in FIG. 13C, the alignment guides 1110*a-d* of array 1100 and the alignment guides 1208*a-d* of array 1200 are designed to correspond to each other. Accordingly, the magnitude of angles $\alpha_{a-d}$ and $\beta_{a-d}$ correspond to each other. Likewise, the recession depth of surfaces 1120*a-d* relative to surfaces 1118*a-d* corresponds to the magnitude of projection of surfaces 1212*a-d*. This correspondence permits the stacking of the arrays 1100 and 1200 in a manner that aligns the lenses of each array.

The angles $\alpha_{a-d}$, $\beta_{a-d}$, and $\gamma_{a-d}$ can vary, depending on the implementation. In some implementations, angle $\alpha_{a-d}$ is between approximately 0° to 90° (e.g., between 30° and) 60°. Angle $\beta_{a-d}$ is dependent on angle $\alpha_{a-d}$, and may be, for example, between 0° and 90° (e.g., between 30° and 60°). As an example, in some implementations, surfaces 1112*a-d* and 1210*a-d* can be configured to abut along a substantial portion of their respective lengths. Consequently, in some implementations, angle $\alpha_{a-d}$ and angle $\beta_{a-d}$ may be equal (e.g., angle $\alpha_{a-d}$ may be 60° and angle $\beta_{a-d}$ may be 60°). In some cases, angle $\alpha_{a-d}$ and angle $\beta_{a-d}$ need not be exactly equal. For example, in some implementations, angle $\alpha_{a-d}$ and angle $\beta_{a-d}$ can be approximately the same, such that the difference between the angles is within a particular acceptable range (e.g., within a range of 0-5°). As an example, in implementations where angle $\alpha_{a-d}$ and angle $\beta_{a-d}$ are approximately the same, angle $\alpha_{a-d}$ may be 60°, and angle $\beta_{a-d}$ may be 61°. The range of differences between approximately the same angles can differ, depending on the implementation. Angle $\gamma_{a-d}$ can also vary, depending on the implementation. For example, angle $\gamma_{a-d}$ may be an angle between 0° and 90°. In some implementations, angle $\gamma_{a-d}$ depends on dimensional and optical requirements of the arrays and their lenses. For example, angle γ may be selected such that surfaces 1214*a-d* do not interfere with the optical performance of each of the lenses.

The width of recession cap surfaces 1120*a-d* and projection cap surfaces 1212*a-d* can also vary, depending on the implementation. In some implementations, recession cap surfaces 1120*a-d* and projection cap surfaces 1212*a-d* are substantially similar in width, such that appreciable misalignment of the lenses of arrays 1100 and 1200 within the plane normal to recession cap surfaces 1120*a-d* and projection cap surfaces 1212*a-d* is minimized. Peripheral surfaces 1118*a-d* provide mechanical stability for alignment guides 1110*a-d*, can be dimensioned accordingly.

Figure 14:
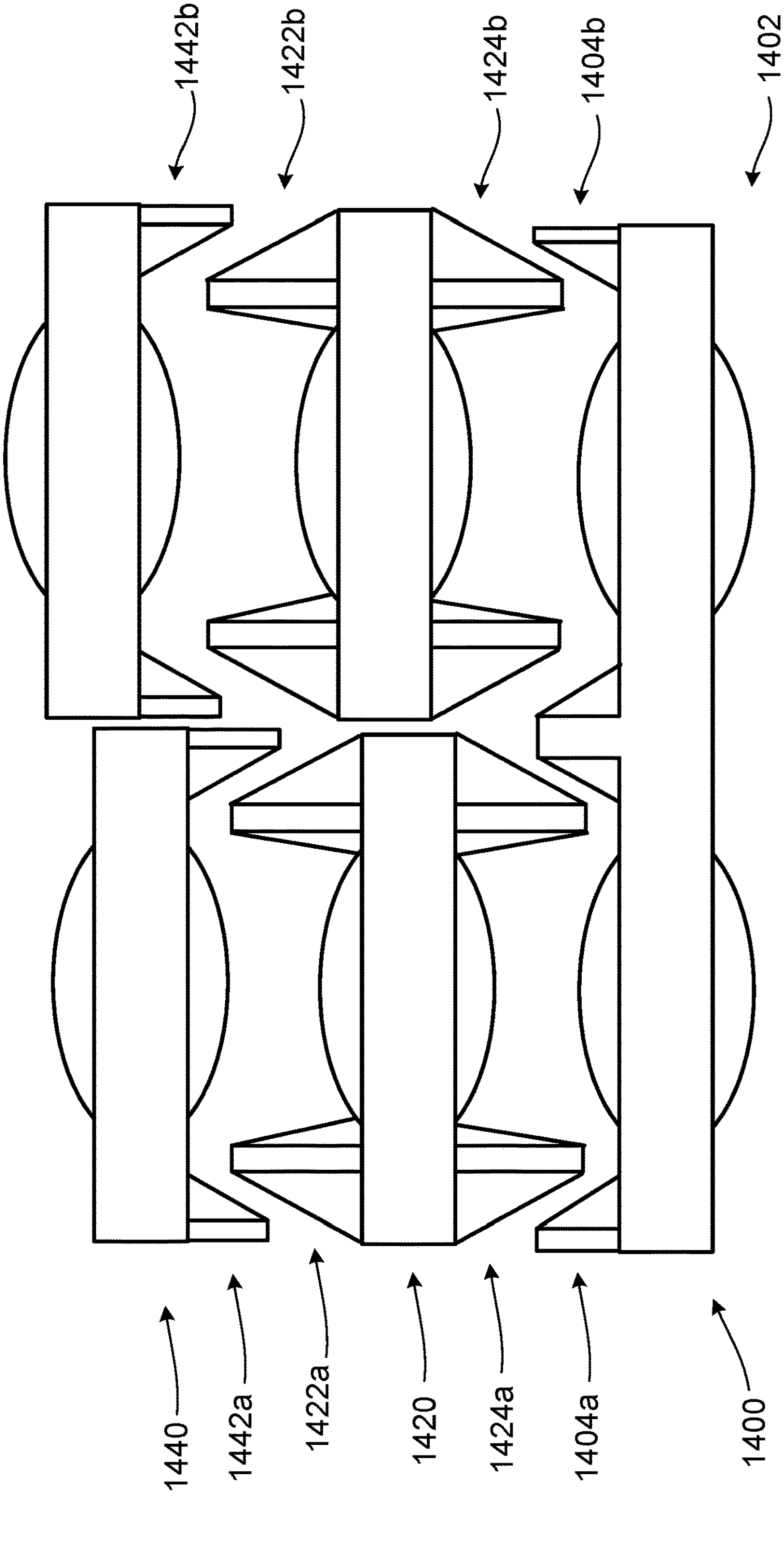
FIG. 14 illustrates a cross-section view of another example contiguous array of beam shaping elements and example arrays of single lenses.

Although the foregoing examples show a laterally contiguous array of lenses positioned on the sensor side of an array of individually formed, laterally non-contiguous lenses (e.g., the side facing an sensor of an imaging device), this need not be the case. For example, in some implementations, a laterally contiguous array can be stacked on the object side of an array of individually formed, laterally non-contiguous lenses. Further, although only two arrays of lenses are shown in the examples above, in some implementations, three or more arrays of lenses can be stacked together. For example, FIG. 14 shows a cross sectional view of a stack of lens arrays 1400, 1420 and 1440 (showing arrays 1400, 1420 and 1440 before they are fully inserted into each other). Lens array 1400 is a laterally contiguous array formed as a monolithic piece 1402, and includes alignment guides 1404*a-b*. Lens array 1420 is a laterally non-contiguous array of lenses (i.e., an array of lenses, none of which is part of a contiguous array that laterally spans more than one optical channel), and includes upper alignment guides 1422*a-b* and lower alignment guides 1424*a-b*. Lens array 1440 is also a laterally non-contiguous array of individual lenses, and includes alignment guides 1442*a-b*. As shown in FIG. 14, alignment guides 1404*a-b* correspond with lower alignment guides 1424*a-b*, such that when array 1420 is inserted into array 1400, alignment guides 1404*a-b* abut alignment guides 1424*a-b*, and the lenses of each array align to form optical channels. Likewise, upper alignment guides 1422*a-b* correspond with alignment guides 1442*a-b*, such that when array 1420 is inserted into 1440, alignment guides 1422*a-b* abut alignment guides 1442*a-b*, and the lenses of each array align to form optical channels.

Stacked arrays can be held together in various ways. For example, in some implementations, stacked arrays can be held together by the frictional and/or compressive forces between them (e.g., the frictional and/or compressive forces between their corresponding alignment guides). In some implementations, stacked arrays can be held together by an adhesive, either in addition to or instead of frictional and/or compressive forces. For example, an adhesive can be placed between each of the alignment guides of two arrays, such that they adhere to each other.

In some cases, when one array is inserted into the other, the alignment guides of one array are seated flush against the alignment guides of the other array (e.g., as illustrated in FIG. 13C). This flush contact can be provided by designing the alignment guides such that the surfaces of one alignment guide correspond to the surfaces of another. For example, as shown in FIGS. 11B and 12B, the angles $\alpha_{a-d}$ and $\beta_{a-d}$ of arrays 1100 and 1200 can be substantially similar, such that surfaces 1112*a-d* and 1210*a-d* abut over a substantial portion of their respective surfaces/lengths when laterally non-contiguous array 1200 is inserted into laterally contiguous array 1100. Likewise, surfaces 1120*a-d* and 1212*a-d* can be designed to abut over a substantial portion of their respective surfaces/lengths when laterally non-contiguous array 1200 is inserted into laterally contiguous array 1100. Further, although the foregoing examples show various surfaces of corresponding alignment guides abutting, corresponding surfaces need not always abut. For example, in some implementations, surfaces 1120*a-d* and surfaces 1212*a-d* do not abut, and are instead separated by a gap. In these implementations, arrays may be positioned and aligned by the abutment of other surfaces, for example surfaces 1112*a-d* and 1210*a-d*.

Figure 15:
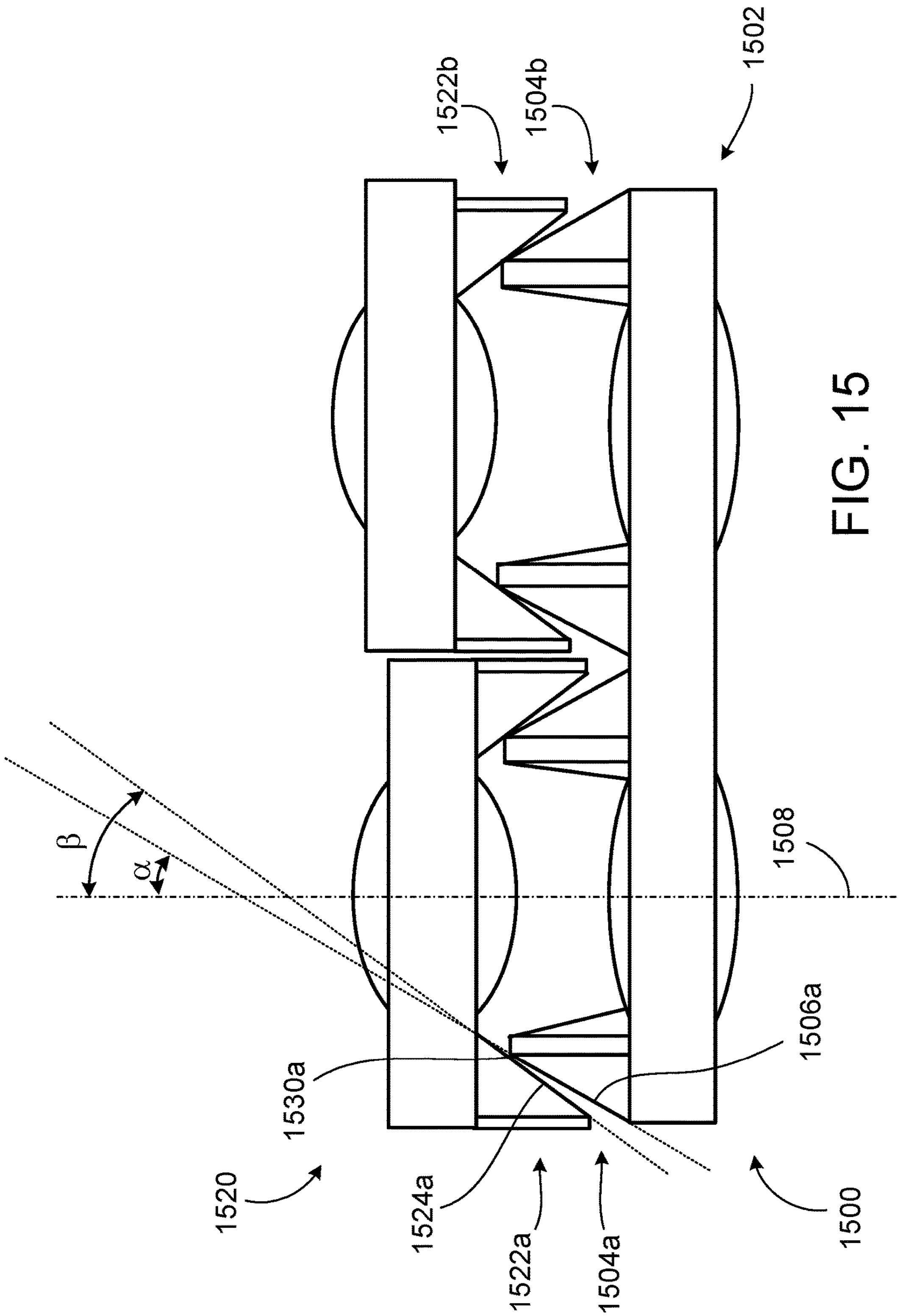
FIG. 15 illustrates a cross-section view of another example contiguous array of beam shaping elements and example array of single lenses.

In some implementations, the alignment guides of an array may be substantially rigid (e.g., cannot be readily deformed). In other implementations, the alignment guides of an array may deform under pressure. In these implementations, the angles of corresponding alignment guides do not need to be substantially similar. As an example, FIG. 15 shows a cross-sectional view of a stack of lens arrays 1500 and 1520. Lens array 1500 is a contiguous array formed as a monolithic piece 1502, and includes alignment guides 1504*a-b*. Lens array 1520 is a non-contiguous array of individual lenses, and includes alignment guides 1522*a-b*. As shown in FIG. 15, alignment guides 1504*a-b* and 1522*a-b* do not exactly correspond to each other. For example, surface 1506*a* is inclined relative to an optical axis 1508 by an angle $\alpha$, and surface 1524*a* is inclined relative to the optical axis 1508 by an angle $\beta$, where angles $\alpha$ and $\beta$ are different. In some implementations, the difference between angles $\alpha$ and $\beta$ can be a few degrees (e.g., 2-5° or greater). Thus, as shown in FIG. 15, surfaces 1506*a* and 1524*a* are not initially flush, and contact along a contact surface 1530*a*.

In some implementations, if one or more of the alignment guides (e.g., alignment guides 1504*a-b* and 1522*a-b*) are deformable, when arrays 1500 and 1520 are pressed together, these deformable alignment guides can deform in order to provide flush seating between the opposing alignment guides. For example, if alignment guide 1504*a* is deformable, upon application of pressure, alignment guide 1504*a* might deform inwards towards optical axis 1508, increasing angle $\alpha$ such that it matches $\beta$. As a result of this deformation, flush seating is provided between alignment guides 1504*a* and 1522*a*. In some implementations, a deformable alignment guide can also be resilient, such that upon elastic deformation, an additional frictional or compressive force between two opposite alignment guides remains after pressure is released. Accordingly, the two stacked arrays may be more securely held together. As an example, referring to FIG. 15, if alignment guide 1504*a* is elastically deformable, it may deform inward towards optical axis 1508 when arrays 1500 and 1520 are pressed together. Due to its resilience, alignment guide 1504*a* applies a residual outward force towards alignment guide 1522*a*, even after arrays 1500 and 1520 are no longer pressed together. In some implementations, this residual compressive force can increase the frictional forces between the alignment guides, and provide a more secure fit. These residual forces are dependent on the shape/dimensions of the alignment guides and on the properties (e.g., the elastic moduli) of materials used to fabricate them, and can differ, depending on the implementation.

Figure 16:
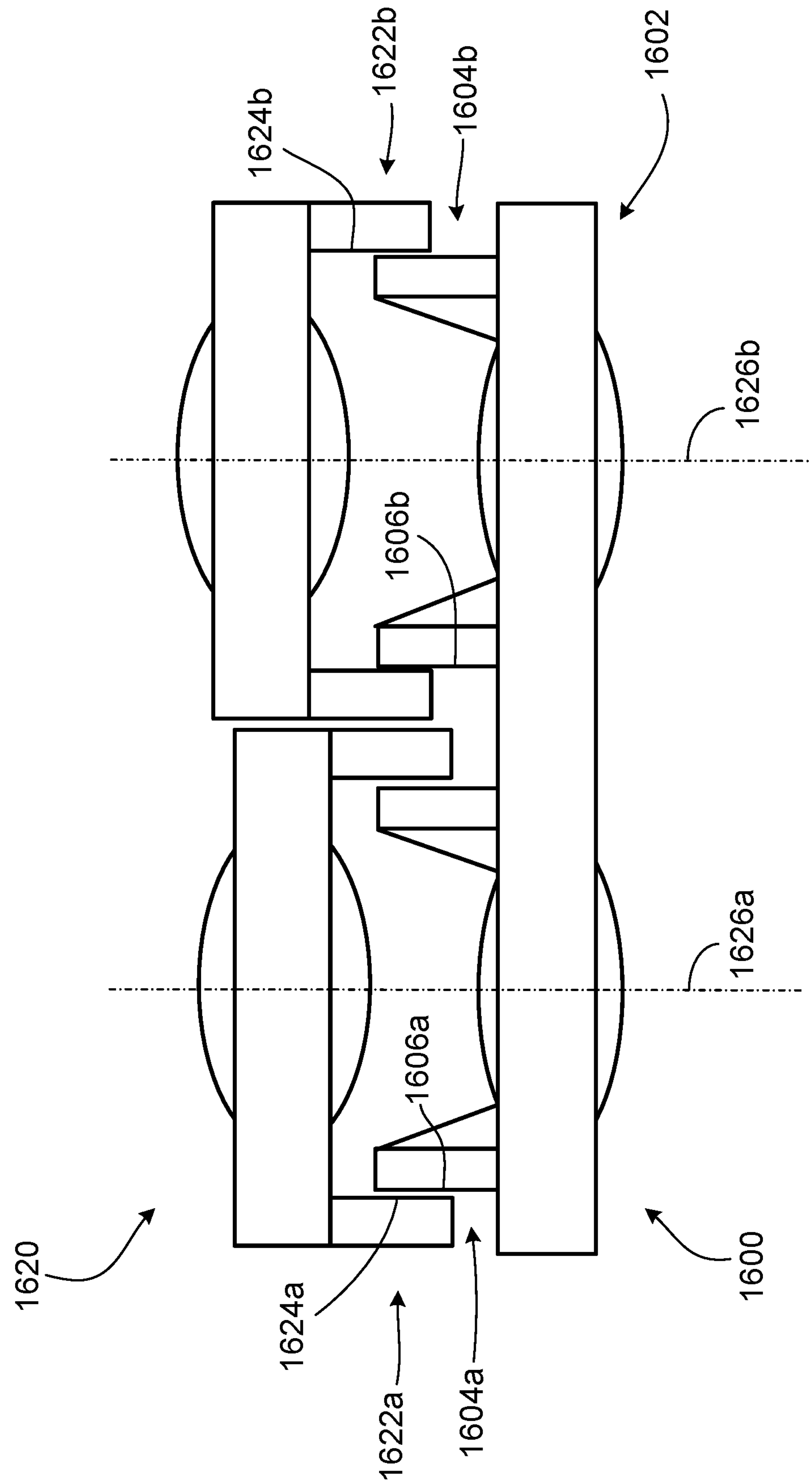
FIG. 16 illustrates a cross-section view of another example contiguous array of beam shaping elements and example array of single lenses.

Although alignment guides are shown as having projection and recession surfaces that are at oblique angles (e.g., acute or obtuse angles) relative to a lens' optical axis, this need not be the case. In some implementations, the projection and recession surfaces can be at substantially right angles relative to a lens' optical axis. For example, FIG. 16 shows a cross-sectional view of a stack of lens arrays 1600 and 1620. Lens array 1600 is a contiguous array formed as a monolithic piece 1602, and includes alignment guides 1604*a-b*. Lens array 1620 is a non-contiguous array of individual lenses, and includes alignment guides 1622*a-b*. As shown in FIG. 16, alignment guides 1604*a-b* and 1622*a-b* have corresponding surfaces 1606*a-b* and 1624*a-b*, respectively, that are substantially parallel to optical axes 1626*a-b*. As described above, lens arrays 1600 and 1620 can be held together by compressive and/or frictional forces between the alignment guides, by an adhesive substance, or by a fastening mechanism.

In some of the examples above, stacked arrays are shown as having alignment guides that perfectly correspond with each other. For example, referring to FIG. 13C, alignment guides 1208*a-b* are show as corresponding perfectly with alignment guides 1110*a-b*, such that no gap exists between each set of alignment guides when array 1200 is inserted into array 1102. To account for manufacturing tolerances, in some implementations, alignment guides can be arranged to provide a small gap (e.g., a lateral or vertical gap) when the alignment guides of one array are inserted into alignment guides of another array. As an example, in some implementations, referring to FIG. 13C, alignment guides 1118*a-b* can be configured such that they are slightly narrower than the recess of alignment guides 1110*a-b*. In this manner, alignment guides of array 1200 can still be inserted into alignment guides of array 1102, even if the dimensions vary due to variations in manufacturing. Likewise, other arrays (e.g., one of more of the implementations described above) can be similarly configured to account for variations in manufacturing.

Implementations of the arrays described above provide for the stacking and alignment of a contiguous lens array with a single individual lens or an array of non-contiguous lenses. Implementations of these arrays may provide certain benefits. For example, some implementations allow for the combination of dimensionally non-critical contiguous lens arrays and dimensionally critical single lenses within the same lens-array stack. Further, the dimensionally non-critical contiguous lens array may define the lateral positions of each optical channel of a multi-optical-channel imager, while the single lenses, made to more exacting specifications, may dominate optical performance.

Various modifications may be made within the spirit of the invention. For example, the recession lens-stacking features may be incorporated into single lenses of a single lens array and corresponding projection lens-stacking features may be incorporated into a monolithic lens array. Other implementations may, for example, employ square single lenses, or lenses with at least one flat side, in a non-contiguous lens array, or employ square lenses, or lenses with at least one flat side, in a contiguous lens array, or combinations of square and round lenses.

Other implementations are within the scope of the claims.

What is claimed is:

1. An optoelectronic module having a plurality of optical channels, the module comprising:

an image sensor including light sensitive regions each of which is associated with a respective one of the optical channels;

a first laterally contiguous array of first beam shaping elements, each of which is associated with a different respective one of the optical channels;

a second laterally contiguous array of beam shaping elements, wherein the second laterally contiguous array is of a type different from the first laterally contiguous array; and one or more second beam shaping elements that are not part of a laterally contiguous array spanning more than one of the optical channels, wherein each of the one or more second beam shaping elements is associated with a respective one of the optical channels, wherein one of the first or second laterally contiguous arrays includes multiple beam shaping elements formed together with a common body portion as a single monolithic piece and another of the first or second laterally contiguous arrays includes replicated beam shaping elements on a common transparent substrate.

2. The module of claim 1 wherein the first laterally contiguous array includes multiple beam shaping elements formed together with a common body portion as a single monolithic piece.

3. The module of claim 1 wherein the one or more second beam shaping elements form a laterally non-contiguous array of individual beam shaping elements each of which is laterally separated from other beam shaping elements in the same non-contiguous array.

4. The module of claim 1 wherein the first and second beam shaping elements are lenses.

5. The module of claim 1 including a laterally non-contiguous array of second beam shaping elements, wherein each of second beam shaping elements in the non-contiguous array is associated with a different respective one of the optical channels.

6. The module of claim 5 wherein the first laterally contiguous array of beam shaping elements and the non-contiguous array of beam shaping elements are stacked one above another and are separated from one another by a spacer.

7. The module of claim 5 wherein the first laterally contiguous array of beam shaping elements and the non-contiguous array of beam shaping elements are disposed in a single unitary barrel.

8. The module of claim 1 wherein the first laterally contiguous array is disposed nearer the image sensor than the one or more second beam shaping elements.

9. The module of claim 1 wherein the first beam shaping elements in the first laterally contiguous array are substantially co-planar with one another.

10. The module of claim 1 wherein at least some of the second beam shaping elements are substantially co-planar with one another.

11. The module of claim 1 including a plurality of second beam shaping elements that are offset from one another in a direction of an optical axis for the module.

12. The module of claim 1 wherein the first laterally contiguous array includes beam shaping elements having a different size or shape from one another.

13. The module of claim 1 wherein at least some of the first or second beam shaping elements include a substantively opaque coating on a part of their surface.

14. The module of claim 1 wherein at least some of the first or second beam shaping elements include a substantially opaque coating on an optically inactive region.

15. An optoelectronic module having a plurality of optical channels, the module comprising: an image sensor including light sensitive regions each of which is associated with a respective one of the optical channels; a first laterally contiguous array of first beam shaping elements, each of which is associated with a different respective one of the optical channels; a second laterally contiguous array of beam shaping elements, wherein the second laterally contiguous array is of a type different from the first laterally contiguous array; and one or more second beam shaping elements that are not part of a laterally contiguous array spanning more than one of the optical channels, wherein each of the one or more second beam shaping elements is associated with a respective one of the optical channels, wherein the first laterally contiguous array of beam shaping elements is disposed in a first lens barrel, and each of the one or more second beam shaping elements is disposed in a respective second lens barrel different from the first lens barrel, and wherein one of the first or second laterally contiguous arrays includes multiple beam shaping elements formed together with a common body portion as a single monolithic piece and another of the first or second laterally contiguous arrays includes replicated beam shaping elements on a common transparent substrate.

16. An optoelectronic module having a plurality of optical channels, the module comprising: an image sensor including light sensitive regions each of which is associated with a respective one of the optical channels; a first laterally contiguous array of first beam shaping elements, each of which is associated with a different respective one of the optical channels; a second laterally contiguous array of beam shaping elements, wherein the second laterally contiguous array is of a type different from the first laterally contiguous array; and a plurality of second beam shaping elements that are not part of a laterally contiguous array spanning more than one of the optical channels, wherein each of the second beam shaping elements is disposed on a same side of the first array of beam shaping elements as the other second beam shaping elements and is associated with a respective one of the optical channels, wherein at least some of the second beam shaping elements are substantially not co-planar with one another; wherein one of the first or second laterally contiguous arrays includes multiple beam shaping elements formed together with a common body portion as a single monolithic piece and another of the first or second laterally contiguous arrays includes replicated beam shaping elements on a common transparent substrate.

* * * * *